United States Patent
Takeuchi et al.

(10) Patent No.: US 11,400,881 B2
(45) Date of Patent: Aug. 2, 2022

(54) KNEE PROTECTION AIRBAG DEVICE

(71) Applicant: TOYODA GOSEI CO., LTD., Kiyosu (JP)

(72) Inventors: Ayano Takeuchi, Kiyosu (JP); Keiichiro Takebayashi, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 16/907,447

(22) Filed: Jun. 22, 2020

(65) Prior Publication Data

US 2020/0406850 A1 Dec. 31, 2020

(30) Foreign Application Priority Data

Jun. 26, 2019 (JP) .............................. JP2019-118987
Mar. 31, 2020 (JP) .............................. JP2020-063220

(51) Int. Cl.
*B60R 21/231* (2011.01)
*B60R 21/237* (2006.01)
*B60R 21/201* (2011.01)
*B60R 21/206* (2011.01)
*B60R 21/215* (2011.01)
*B60R 21/235* (2006.01)
*B60R 21/00* (2006.01)

(52) U.S. Cl.
CPC .......... *B60R 21/231* (2013.01); *B60R 21/201* (2013.01); *B60R 21/206* (2013.01); *B60R 21/215* (2013.01); *B60R 21/237* (2013.01); *B60R 21/235* (2013.01); *B60R 2021/0051* (2013.01); *B60R 2021/2375* (2013.01); *B60R 2021/23169* (2013.01); *B60R 2021/23538* (2013.01)

(58) Field of Classification Search
CPC ... B60R 21/231; B60R 21/237; B60R 21/215; B60R 21/201; B60R 21/206; B60R 2021/0051; B60R 2021/23169
USPC ........................................................ 280/730.1
See application file for complete search history.

(56) References Cited

U.S. PATENT DOCUMENTS

| | | | | |
|---|---|---|---|---|
| 8,430,423 B2 * | 4/2013 | Matsuda | ............... | B60R 21/04 280/730.2 |
| 8,727,373 B2 * | 5/2014 | Mori | ................... | B60R 21/213 280/728.2 |

(Continued)

FOREIGN PATENT DOCUMENTS

JP 2003-170801 A 6/2003

*Primary Examiner* — Keith J Frisby
(74) *Attorney, Agent, or Firm* — Posz Law Group, PLC

(57) ABSTRACT

A knee protection airbag device includes an airbag. When the air bag is accommodated, an occupant side wall portion and a vehicle body side wall portion are overlapped and expanded flatly and roll-folding is performed such that an upper edge side of a knee receiving portion side approaches a lower edge side of the mounting portion side, end side portions on left and right sides of the roll-folded roll folding portion are formed as folded portions which fold over a central portion near a center in a left-right direction of the roll folding portion to form a folding completed body. A joining between a first overlapping portion and a tip side part of the airbag is released when an inflation gas flows into the airbag and when a fold of a first fold is canceled and the first overlapping portion deviates from a rear area of the central portion.

14 Claims, 20 Drawing Sheets

(56) References Cited

U.S. PATENT DOCUMENTS

2004/0245750 A1 12/2004 Takimoto et al.
2015/0197210 A1* 7/2015 Abe .................. B60R 21/233
　　　　　　　　　　　　　　　　　　　　280/729

* cited by examiner

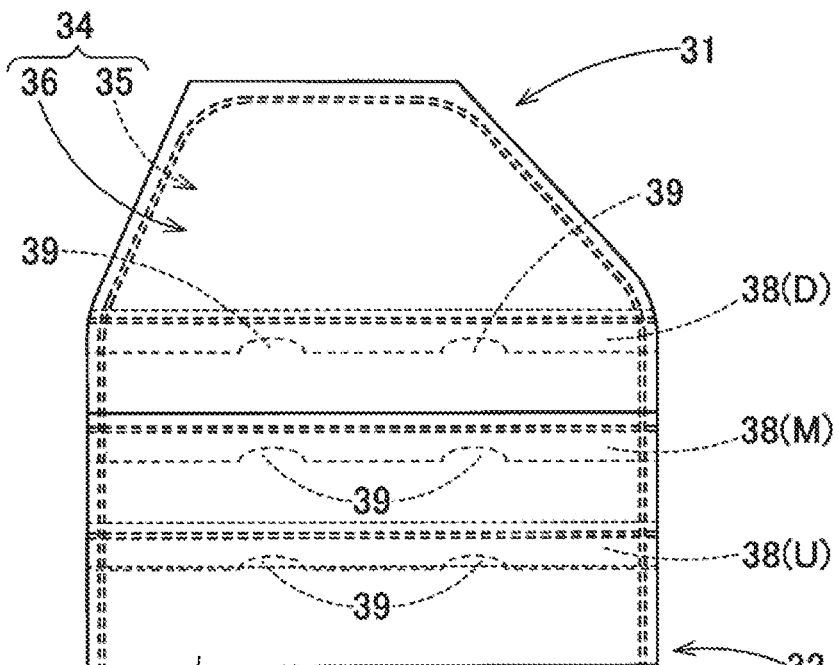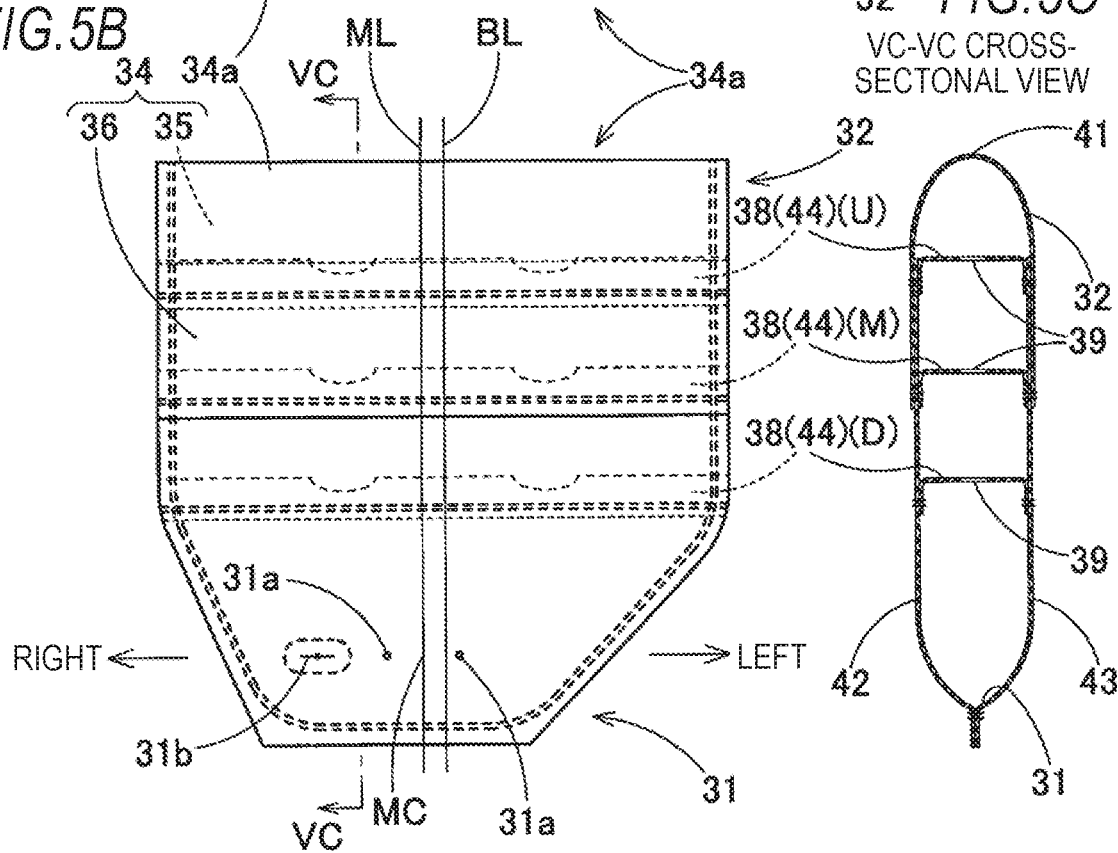

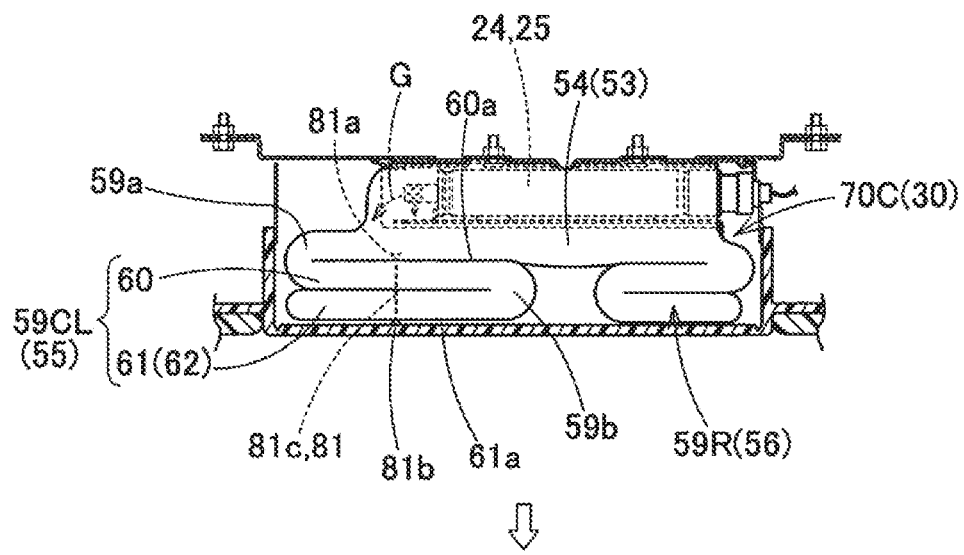

KNEE PROTECTION AIRBAG DEVICE

CROSS-REFERENCE TO RELATED APPLICATION(S)

This application is based upon and claims the benefit of priority from prior Japanese patent applications No. 2019-118987 filed on Jun. 26, 2019, and No. 2020-063220 filed on Mar. 31, 2020, the entire contents of which are incorporated herein by reference.

BACKGROUND

1. Field of the Invention

The present invention relates to a knee protection airbag device in which an airbag which is expanded and inflated by inflowing inflating gas can protect knees of an occupant such as a driver or a passenger in a passenger seat.

2. Description of the Related Art

In a knee protection airbag device of the related art, it is configured such that an airbag which protects the occupant's knee is equipped with an outer peripheral wall which connects the outer peripheral edges of an occupant side wall portion on an occupant side and a vehicle body side wall portion on a vehicle body side and, as an expansion completion shape, a mounting portion, which is an upstream part at the time of inflow of inflation gas and is attached to an accommodation part with a width dimension in a left-right direction capable of being accommodated in the accommodation part, is disposed on a lower side, and further a knee receiving portion is arranged on an upper side with a width dimension that is wider on both left and right sides than the mounting portion (see, for example, JP-A-2003-170801). When accommodating the airbag, the occupant side wall portion and the vehicle body side wall portion are overlapped and expanded flatly and an upper edge side of the knee receiving portion side is roll-folded so as to approach a lower edge side of the mounting portion side, and further end side portions on both the left and right sides of the rolled folding portion are formed as folded portions which are folded over a central portion near a center in a left-right direction of the rolled folding portion, and still further a folding completed body is formed by stacking the folded portion on a center of the roll folding portion, and then the folding completed body is accommodated in the accommodation part. In addition, in such a folding completed body of the airbag, when the inflation is to start, the center of the roll folding portion swells and the left and right end side portions also try to swell. At that time, the folded portions composed of the end side portions are expanded to the left and right and is expanded and inflated to the rear upper side while canceling the fold such that the entire roll folding of the roll folding portion is released in a state where the width dimension in a left-right direction is widened. As a result, in such an airbag, the airbag expands in an initial stage of inflation with widening the width in the left-right direction, and then the air bag is expanded upward and inflated so as to increase the thickness. Therefore, it is possible to smoothly arrange the knee receiving portion on the front side of a knee, even when a gap between the accommodation part and the knee is narrow.

However, in the airbag of the related art, when the width dimension of the knee receiving portion in the left-right direction is wider than the accommodation part, the end side portions on both the left and right sides of the roll folding portion need to be accommodated in the accommodation part as a folded portion in which at least two folds are made with respect to the central portion near the center in the left-right direction of the roll folding portion. In this case, at the initial stage of the inflation of the airbag, with the elimination of a plurality of folds, the folded portions (end side portions) is to be expanded in the left and right direction while protruding largely rearward in a rear area of the central portion of the roll folding portion. As a result, there is a problem that the amount of protrusion to the rear before expanding in the left-right direction is increased. When there is such a problem, for example, if the occupant's shin approaches the accommodation part, at the initial stage of inflation of the airbag, when tips of the end side portions expand to the left and right while largely protruding rearward in the rear area of the central portion of the roll folding portion, it enters the back of the occupant's shin. As a result, there is a possibility that the knee receiving portion of the airbag after that cannot be smoothly placed in front of the knee.

SUMMARY

The invention is to solve the problems described above and an object thereof is to provide a knee protection airbag device capable of suppressing an amount of rearward protrusion of an end side portion in a roll folding portion of an airbag at an initial stage of inflation.

According to an aspect of the invention, there is provided a knee protection airbag device including an airbag which is folded and accommodated in an accommodation part located in front of and below a knee of a seated occupant and is expanded and inflated toward a upper rear side from the accommodation part and causes a knee receiving portion to be arranged in front of the knee of the occupant when inflation gas flows in, wherein: the airbag includes an outer peripheral wall which connects outer peripheral edges of an occupant side wall portion on an occupant side and a vehicle body side wall portion on a vehicle body side; as an expansion completed shape of the airbag, a mounting portion, which is an upstream portion at the time of inflow of the inflation gas, and which is attached to the accommodation part with a lateral width dimension capable of being accommodated in the accommodation part, is disposed on a lower side and the knee receiving portion having a width dimension that is wider on both left and right sides than the mounting portion is arranged on an upper side; when the air bag is accommodated, the occupant side wall portion and the vehicle body side wall portion are overlapped and expanded flatly and roll-folding is performed such that an upper edge side of the knee receiving portion side approaches a lower edge side of the mounting portion side, end side portions on left and right sides of the roll-folded roll folding portion are formed as folded portions which fold over a central portion near a center in a left-right direction of the roll folding portion, the folded portion is overlapped with the central portion of the roll folding portion to form a folding completed body, and the folding completed body is accommodated in the accommodation part; the folded portion on at least one side in the left-right direction in the folding completed body is folded over the central portion with at least two folds, and is disposed by joining a first overlapping portion from a first fold on the central portion side to a second fold and a tip side part connected to the first overlapping portion and extending to a tip side of the end side portion with a joining unit; and a joining strength of the joining unit is set so that the joining between the first overlapping portion and the tip side part is released when the inflation gas flows into the airbag, and when the fold of the first fold is canceled and the first overlapping portion deviates from a rear area of the central portion.

In the knee protection airbag device according to the invention, at the start of inflation of the airbag, the central portion of the roll folding portion is inflated, and the end side portions on both left and right sides are also trying to be inflated, and the folded portion is trying to expand left and right. At that time, in the folded portion on which the joining unit is mounted and which is folded in the central portion with at least two folds, until the first fold is unfolded and the first overlapping portion moves out of the rear area of the central portion, the joining unit maintains the folded state, and thus the tip side part on the tip side of the end side portion does not move rearward so as to separate from the first overlapping portion side of the expanded folded portion. Then, when the first overlapping portion of the folded portion is expanded so as to open to the left-right direction so as to be out of the rear area of the central portion of the roll folding portion, the joining unit releases the joining of the first overlapping portion and the tip side part, and thus the folding of the second fold is canceled. As a result, the folded portion itself expands the tip side of the tip side part to the left-right direction. Therefore, after the folded portion folded at the central portion by providing at least two folds is expanded in the left-right direction of the first overlapping portion that accompanies the cancellation of the folding of the first fold, the second fold is canceled with the uncoupling of the joining unit. As a result, the tip side part is expanded to the left-right direction. Then, along with the central portion of the roll folding portion, the end side portion which includes the first overlapping portion expanded in the left-right direction and the tip side part cancels the roll folding and the knee receiving portion is arranged on the front side of the knee. That is, by the time the joining unit is released from the joining, the folded portion is restrained from projecting to the rear and expanded widely in the left-right direction. Therefore, even when the occupant's shin approaches the accommodation part, at the initial stage of inflation of the airbag, a tip of the end side portion of the folded portion does not significantly protrude rearward in the rear area of the central portion of the roll folding portion. Further, since the roll folding can be canceled in a state where the roll folding portion is separated from the rear area of the central portion to the left and right and widely expanded to the left and right, the knee receiving portion, which has been arranged in the central portion of the roll folding portion or the folded portion area, can be smoothly arranged in front of the knee.

Therefore, in the knee protection airbag device according to the invention, the joining unit can suppress the amount of rearward protrusion of the end side portion in the roll folding portion of the airbag at the initial stage of inflation.

According to the aspect of the invention, one of the left and right folded portions of the folding completed body may be provided with at least two folds and folded over the central portion, and is provided with the joining unit.

That is, the folding completed body may be formed by providing the joining unit only on one side of the left and right folded portions of the folding completed body that needs to suppress the rearward protrusion at the initial stage of inflation.

According to the aspect of the invention, the airbag at the completion of inflation may be arranged so that a mounting center, which is a center of the mounting portion in the left-right direction, is displaced to one side of the left-right direction from a center line in a front-rear direction passing through a center of the knee receiving portion in the left-right direction, the end side portions on both left and right sides of the roll folding portion may be folded with respect to the mounting center side of the central portion of the roll folding portion and formed as the folded portion, and the folded portion of the folding completed body on a side where the joining unit is provided may be a portion on a side of the center line displaced from the mounting center.

In such a configuration, when the airbag at the time of completion of inflation shifts the mounting portion to the left-right direction from the center line passing through the center of the knee receiving portion in the left-right direction, in the left and right end side portions of the roll folding portion, the side which is displaced away from the mounting center of the mounting portion as one side has a longer length dimension than the other side. Therefore, when the joining unit is arranged in the folded portion of the end side portion on one side with the long dimension, the folded portion accurately suppresses the amount of protrusion to the rear and expands in the left-right direction, and then the folded portion can be expanded and inflated so as to release the roll folding. Therefore, in the knee protection airbag device with such a configuration, it is suitable in the case where, even when the knee receiving portion of the airbag is arranged in front of the center of the left and right knees of the occupant in the left-right direction, the mounting center of the mounting portion of the airbag cannot be placed in front of the center in the left-right direction between the left and right knees of the occupant.

Needless to say, the joining unit may be arranged not only on one folded portion side of the left and right folded portions of the folding completed body, but also on both left and right folded portions.

Further, the joining unit may be formed by wrapping the entire circumference of the folded portion along the front-rear direction with a breakable tape material, and the tape material may be set to a strength at which it breaks when the joining between the first overlapping portion and the tip side part is released.

Further, the joining unit may be formed by adhering the breakable tape material from a front side of the central portion on an outer peripheral side of the first fold to a rear side of the folded portion, and the tape material may be set to a strength at which it breaks when the joining between the first overlapping portion and the tip side part is released.

Further, the joining unit may be formed of a flexible sheet material having both ends sewn to a front side of the central portion on an outer peripheral side of the first fold and a rear side of the folded portion, and the sheet material may have a breakable portion, which is broken when the joining between the first overlapping portion and the tip side part is released, disposed in a vicinity of an intermediate portion between sutured portions on a front side of the central portion and a rear side of the folded portion.

Further, the joining unit may be formed of a locking member which includes a shaft portion which is penetrated by the first overlapping portion and the tip side part and a locking head portions disposed at both ends of the shaft portion and locked on front sides of the first overlapping portion and the tip side part, and the locking member may be set to have a strength that the locking head portions are divided so as to be separated from each other when the joining between the first overlapping portion and the tip side part is released.

Further, the joining unit may be formed from a cover which fits the folded portion so as to wrap the folded portion from around the second fold, and the cover is set to a fitting strength which deviates from the folded portion when the joining between the first overlapping portion and the tip side part is released.

The above-mentioned tape material, sheet material, locking member, or cover may be formed of combination of a plurality of the same materials or different materials and the plurality of materials may configure the joining unit.

In this case, when combining the different materials to form the joining unit, it is possible to increase the variation of the control of the expansion direction of the airbag at the time of releasing the joining of the first overlapping portion and the tip side part, or thereafter.

When using the same material, for example, when using a plurality of tape materials, if they are arranged with a separation distance from each other, compared to the case where one tape material is used to wrap the folded portion without any gap, the amount of tape material used can be reduced and the weight can be reduced.

According to the aspect of the invention, the folded portion of the folding completed body may be configured by including the first overlapping portion and a second overlapping portion as the tip side part which is folded back at the second fold and overlaps the first overlapping portion.

Further, a tip side part which is continuous with the first overlapping portion in the folded portion of the folding completed body and extends to a tip side of the end side portion may be configured to include a third fold at the tip of the second fold and include a second overlapping portion extending from the second fold to the third fold and a third overlapping portion extending from the third fold, and the third overlapping portion may be configured to be arranged between the first overlapping portion and the second overlapping portion.

Further, a tip side part which is continuous with the first overlapping portion in the folded portion of the folding completed body and extends to a tip side of the end side portion may be configured to include a third fold at the tip of the second fold and include a second overlapping portion extending from the second fold to the third fold and a third overlapping portion extending from the third fold, and the third overlapping portion is may be arranged so as to be overlapped on a side of the second overlapping portion that is overlapped with the first overlapping portion, away from the first overlapping portion.

BRIEF DESCRIPTION OF THE DRAWINGS

The present invention will become more fully understood from the detailed description given hereinbelow and the accompanying drawing which is given by way of illustration only, and thus is not limitative of the present invention and wherein:

FIGS. 5A to 5C respectively illustrate a bottom view, a plan view, and a schematic vertical cross-sectional view of an airbag used in the knee protection airbag device of the embodiment;

FIGS. 12A and 12B are views illustrating still another modification example of the joining unit used for the folding completed body of the airbag of the embodiment;

DETAILED DESCRIPTION OF THE INVENTION

Hereinafter, an embodiment of the invention will be described with reference to the drawings. As illustrated in FIGS. 1 to 4, a knee protection airbag device KA of the embodiment is arranged below a steering column 2, which is on a vehicle front side of a driver M, that is, in front of and below a knee K, so as to protect the knees K (KL, KR) of the driver M as an occupant.

Figure 1:
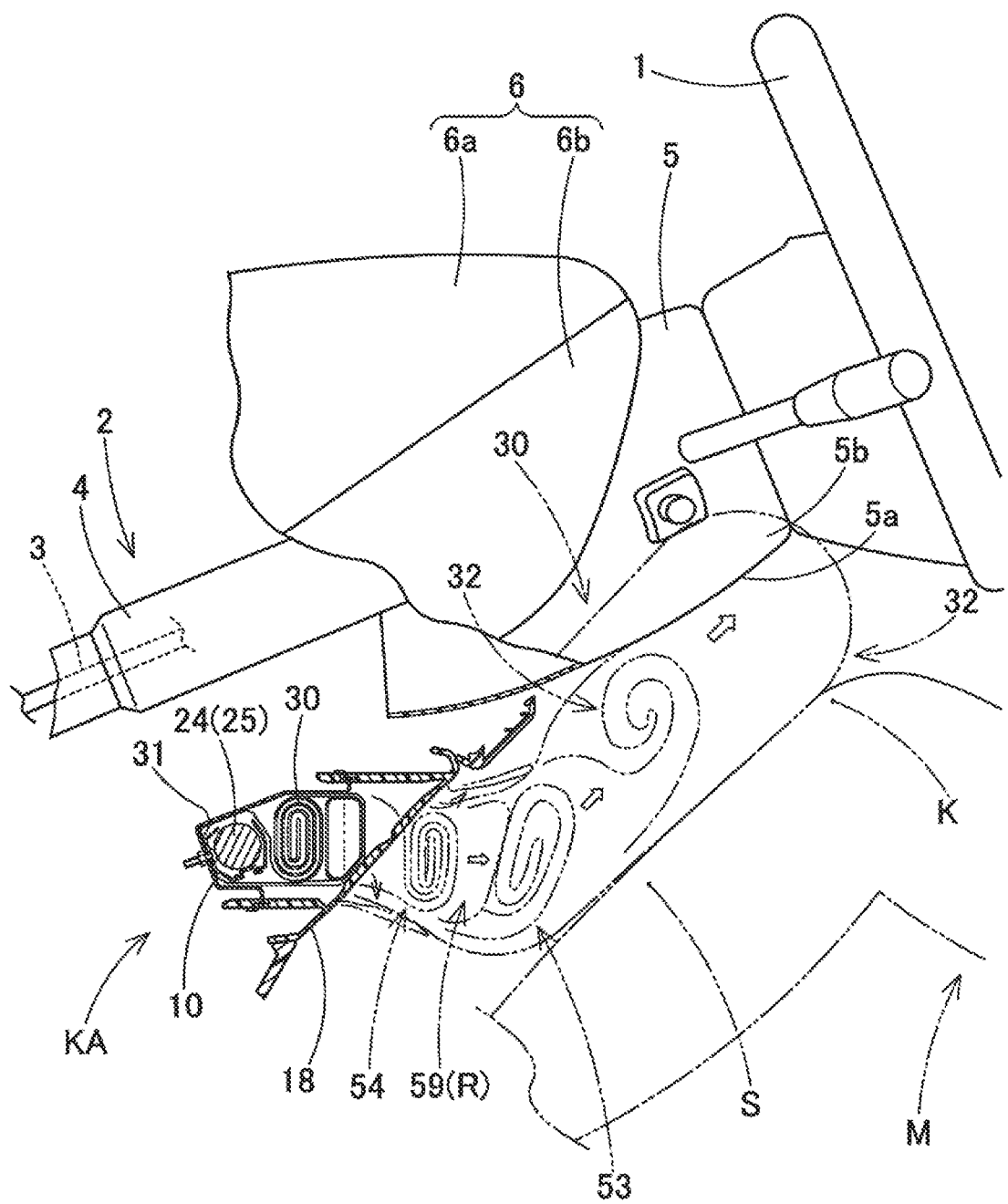
FIG. 1 is a schematic vertical cross-sectional view of a knee protection airbag device according to an embodiment of the invention mounted on a vehicle.

As illustrated in FIG. 1, the steering column 2 is configured to include a main shaft 3 which is covered with a column cover 5 and is connected to a steering wheel 1 and a column tube 4 which covers the periphery of the main shaft 3. Between the main shaft 3 and the column tube 4, a tilt mechanism (not illustrated) capable of adjusting the angle of a ring surface of the steering wheel 1, a telescopic mechanism (not illustrated) capable of moving the steering wheel 1 in the axial direction of the shaft 3 and stopping the mechanism, and the like are provided.

The column cover 5 is made of synthetic resin such as a substantially square tube shape. The column cover 5 is arranged so as to cover the steering column 2 below the steering wheel 1 along an axial direction of the steering column 2 so as to be inclined rearward and upward. The column cover 5 is provided such that the periphery is surrounded by an instrument panel 6 including an upper panel 6a and a lower panel 6b in front of the driver M. A lower surface 5a of a portion protruding from the instrument panel 6 has a substantially rectangular shape and is formed in a curved shape which rises rearward in a vehicle front-rear direction.

The knee protection airbag device KA includes a folded airbag 30, an inflator 24 for supplying inflation gas to the airbag 30, an airbag cover 18 which covers the folded airbag 30, and a case 10 for accommodating the folded airbag 30 and the inflator 24. The knee protection airbag device KA is mounted below the column cover 5 on a vehicle body side and surrounded by the lower panel 6b of the instrument panel 6.

The case 10 is an accommodation part for the airbag 30 and is made of sheet metal. The case 10 is configured to include a bottom wall portion 11 arranged on the front side and a peripheral wall portion 14 extending rearward from a peripheral edge of the bottom wall portion 11 in a substantially rectangular tube shape. The case 10 has a rear end side as a protruding opening 10a through which the airbag 30 at the time of inflation is protruded. In the bottom wall portion 11, mounting holes 11a through which bolts 26a for mounting the inflator 24 and the airbag 30 pass are arranged side by side in a left-right direction and a mounting piece portions 12 extending in the left-right direction are arranged. Each mounting piece portion 12 has a through-hole 12a through which the bolt 9 penetrates and the airbag device KA is mounted to a mounting bracket 8 on the body side using the bolt 9. Each bolt 9 penetrates the through-hole 12a and is fastened to a nut 8a fixed to a mounting bracket 8. Further, the bottom wall portion 11 is provided with a holding protrusion 11b for firmly holding a later-described main body 25 of the inflator 24 on a retainer 26 so as to protrude rearward.

The peripheral wall portion 14 is configured to include an upper wall portion 14a, a lower wall portion 14b, a right wall portion 14c, and a left wall portion 14d which are arranged vertically and horizontally. The upper wall portion 14a and the lower wall portion 14b are formed at their tips (rear ends) with a plurality of hooks 15 which are inserted into locking holes 22a of a mounting wall portion 22 of the airbag cover 18 to lock a mounting wall portion 22. In the right wall portion 14c, an insertion hole 16 is opened so that a base portion 25b side of the main body 25 of the inflator 24 is exposed and a connector 28 to which a lead wire 29 for inputting an operation signal to the inflator 24 is connected can be connected to the base portion 25b side.

The airbag cover 18 is made of a thermoplastic elastomer such as polyolefin. As illustrated in FIGS. 1 to 4, the airbag cover 18 includes a design surface portion 19 exposed from an opening 6c of the lower panel 6b and a substantially square tubular mounting wall portion 22 extending forward from the front surface side of the design surface portion 19.

The design surface portion 19 is provided with a door portion 20 (U, D) which is pushed by the airbag 30 when inflated and opens vertically. The door portions 20U and 20D are arranged so as to close the rear side of the protruding opening 10a of the case 10. When viewed from the rear side of the design surface portion 19, substantially H-shaped thin-walled breakable portions 21 are provided around the periphery thereof. When the airbag 30 is inflated, the breakable portions 21 are each fractured and opened with hinge portions 20a and 20a configured with integral hinges at the upper and lower edges as the center of rotation.

A plurality of locking holes 22a for locking the hooks 15 of the case 10 are formed in the mounting wall portion 22 at positions facing each other in the vertical direction.

Figure 2:
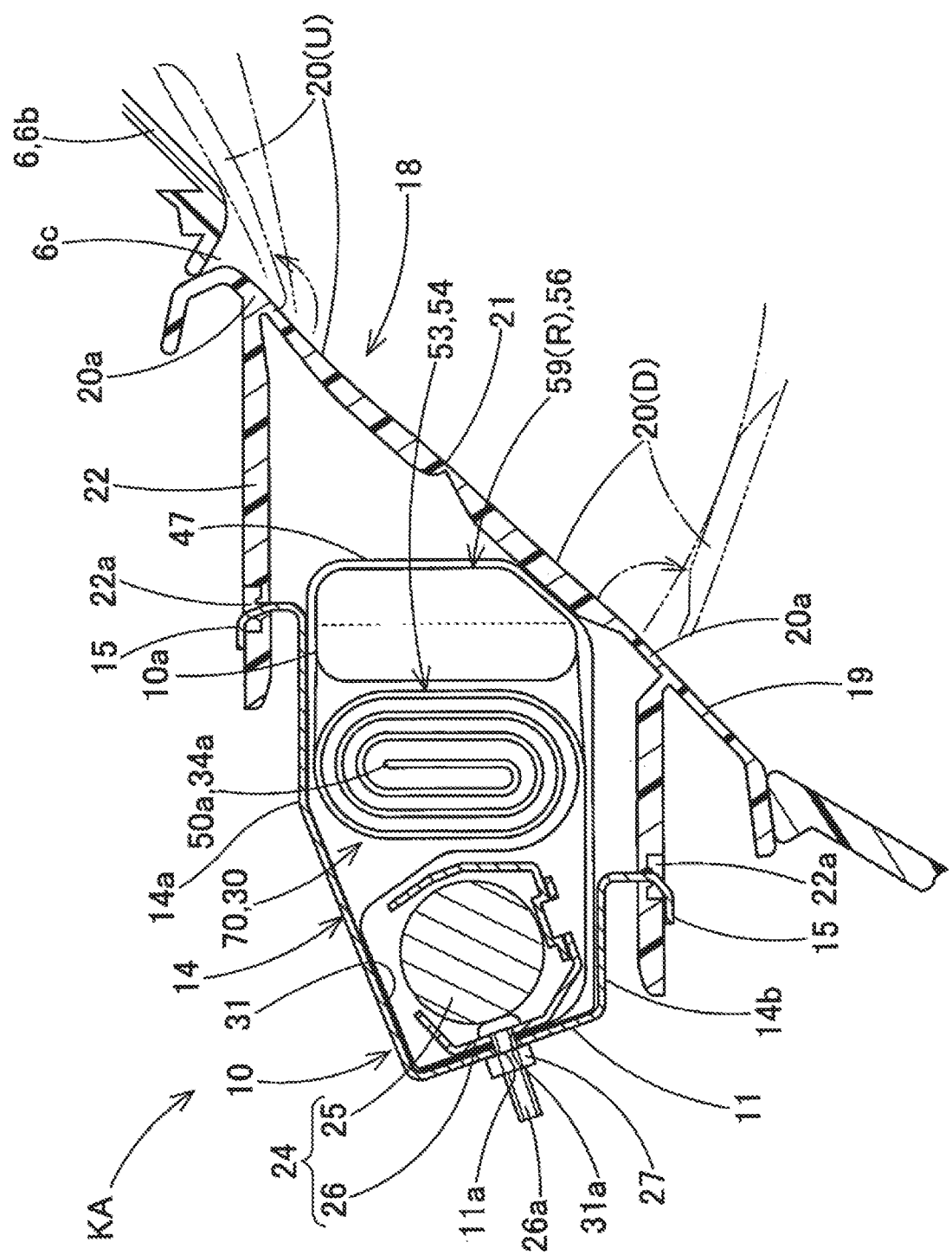
FIG. 2 is a schematic enlarged vertical cross-sectional view of the knee protection airbag device according to the embodiment.
Figure 3:
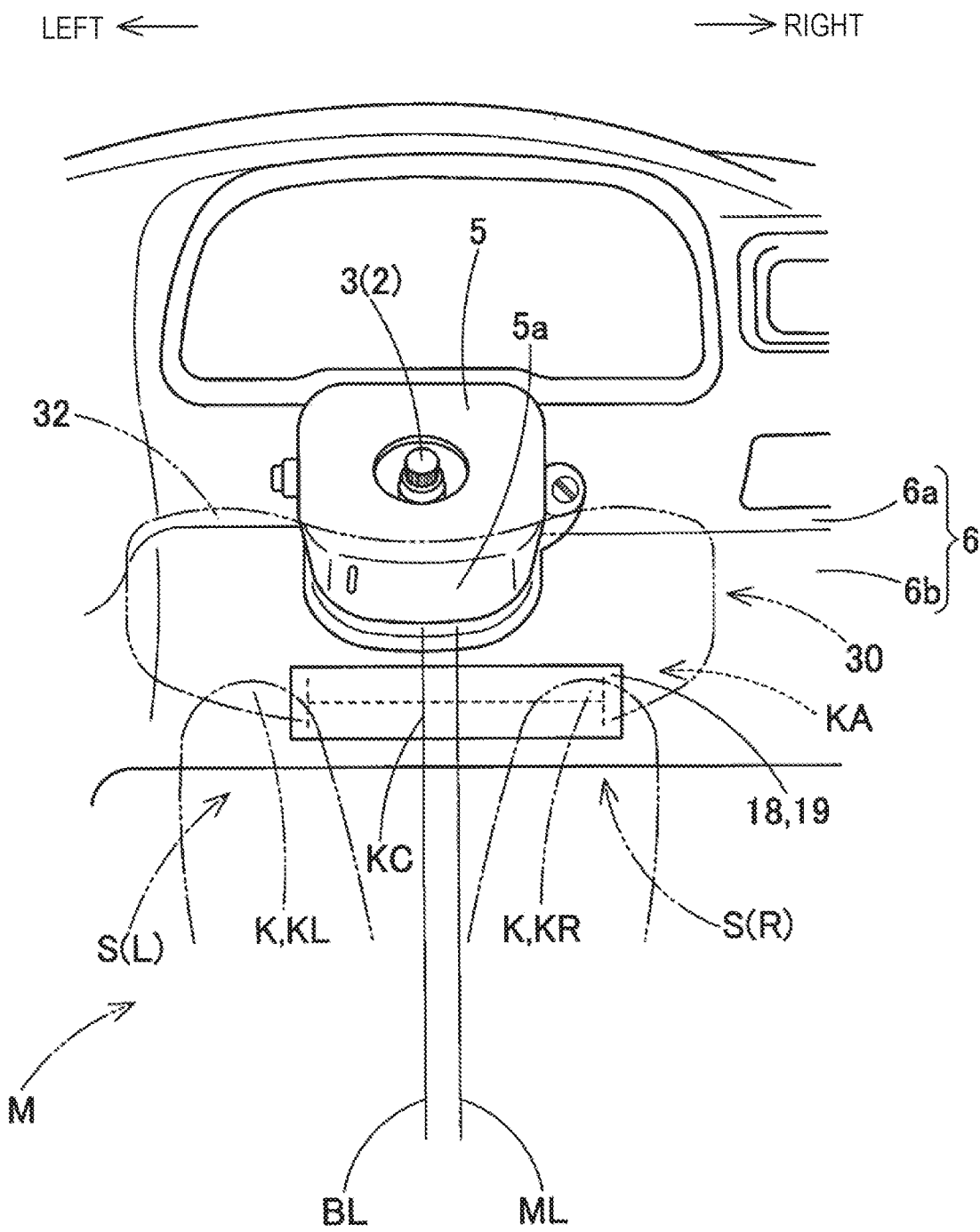
FIG. 3 is a schematic front view of the knee protection airbag device of the embodiment mounted on a vehicle.
Figure 4:
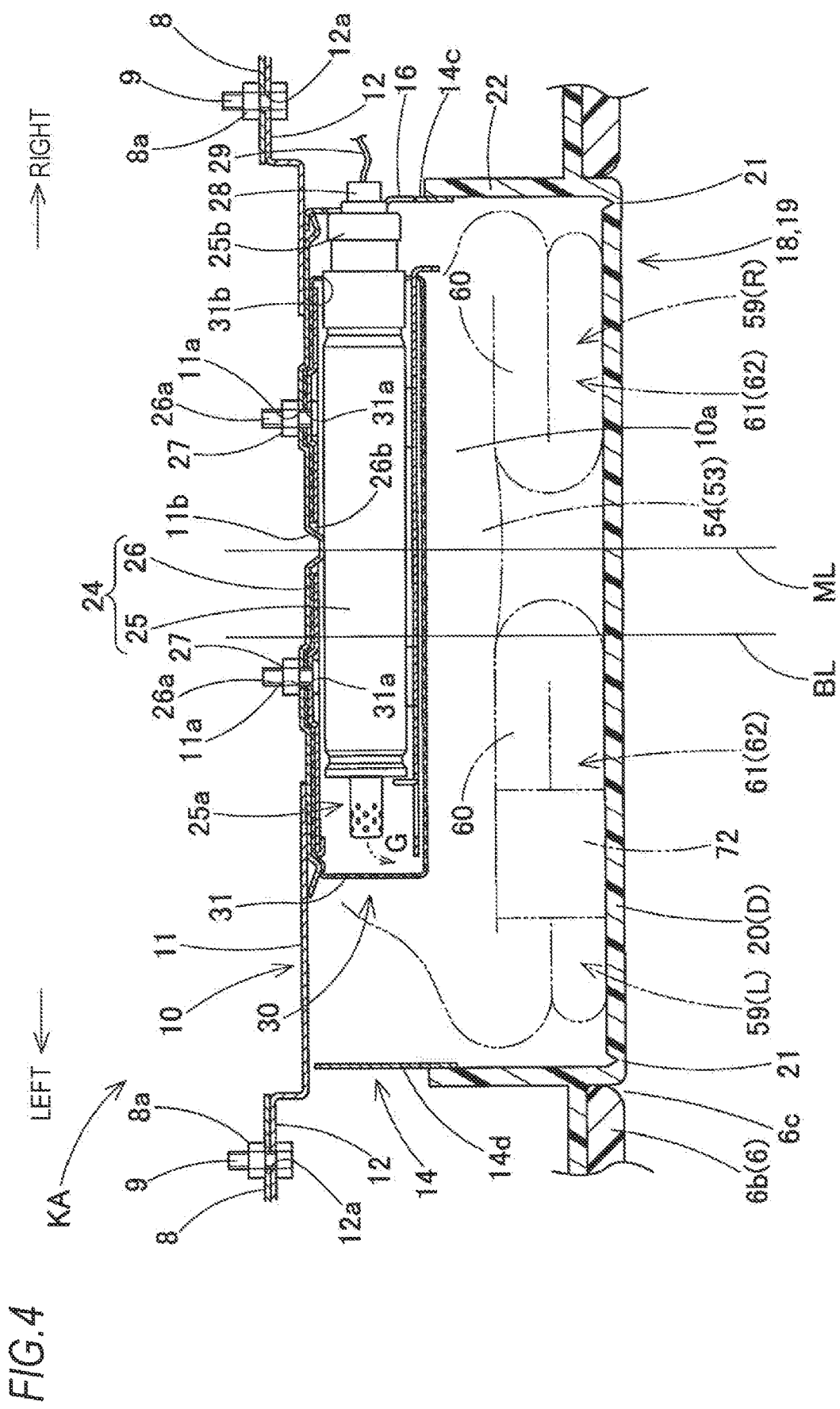
FIG. 4 is a schematic lateral cross-sectional view of the knee protection airbag device of the embodiment mounted on the vehicle.

As illustrated in FIGS. 1, 2, and 4, the inflator 24 includes a substantially columnar main body 25 and a substantially cylindrical retainer 26 which holds the main body 25. The main body 25 has a gas discharge portion 25a for discharging the inflation gas at the tip (left end) and the connector 28 for inputting an operation signal is coupled to the base portion 25b side. The retainer 26 includes the bolt 26a for attaching the inflator 24 to the bottom wall portion 11 of the case 10 and also has a through-hole 26b through which the holding protrusion 11b of the case 10 penetrates. The inflator 24 is accommodated in the case 10 with the main body 25 inserted in the retainer 26 and each bolt 26a is protruded from the inside of the case 10 to the outside of the case 10 through amounting hole 11a. Then, when the nut 27 is fastened to each bolt 26a, the holding protrusion 11b of the case 10 presses the main body 25 through the through-hole 26b of the retainer 26 and presses the main body 25 against an inner peripheral surface of the retainer 26. Therefore, by fastening the nut 27 to the bolt 26a, the retainer 26 of the inflator 24 can be attached to the case 10 and the retainer 26 can firmly hold the main body 25. As a result, the main body 25 and the retainer 26 of the inflator 24 are firmly attached and fixed to the case 10. Needless to say, at the time of this fixing, a mounting portion 31 of the airbag 30, which will be described below, is also pinched between the inflator 24 and the bottom wall portion 11 of the case 10 and firmly fixed to the case 10.

The inflator 24 is operated by receiving an operation signal from a control device for operating an airbag device (not illustrated) mounted on the steering wheel 1 simultaneously with a steering wheel airbag device.

The airbag 30 is made of flexible woven fabric such as polyester or polyamide. As illustrated in FIGS. 1, 3, and 5A to 6, the airbag 30 is configured to include an outer peripheral wall 34 in which outer peripheral edges of an occupant side wall portion 36 on the occupant side and a vehicle body side wall portion 35 on the vehicle body side are connected to each other. The airbag 30 has a substantially rectangular plate shape which approximates the expansion completion shape to the home base shape. The airbag 30 is configured such that the mounting portion 31 which is attached to the case 10 with a width dimension in the left-right direction which can be accommodated in the case 10 as an accommodation part and an upstream portion when the inflation gas G flows in is provided on the lower side. Further, the airbag 30 is configured such that a knee receiving portion 32 having a width dimension that is wider on both left and right sides than the mounting portion 31 is arranged on the upper side.

The mounting portion 31 is configured by arranging two mounting holes 31a for allowing the two bolts 26a of the inflator 24 to pass therethrough in the vehicle body side wall portion 35 side by side in the left-right direction. Further, the mounting portion 31 is configured by providing the insertion hole 31b on the right edge side of the vehicle body side wall portion 35, through which the base portion 25b of the main body 25 of the inflator 24 can be inserted.

Also, inside the airbag 30, tethers 38 (U, M, D) which connect the vehicle body side wall portion 35 and the occupant side wall portion 36 such that, when the inflation of the airbag 30 is completed, the separation distance between the vehicle body side wall portion 35 and the occupant side wall portion 36 is regulated so that the airbag 30 is inflated into a plate shape having a substantially constant thickness dimension are arranged in upper and lower three stages. Each tether 38 is arranged along the left-right direction and has gas flow holes 39 through which the inflation gas G flows upward at two left and right positions.

Also, the airbag 30 of the embodiment has a substantially left-right symmetrical shape with a center line BL in the front-rear direction passing through the center in the left-right direction of the knee receiving portion 32 on the upper portion side as the center, except for the vicinity of the downward narrowing mounting portion 31 on the lower end side. However, in the airbag 30, the two mounting holes 31a of the mounting portion 31 are arranged so as to be offset in one of the left and right directions with respect to the center line BL, in the case of the embodiment, to the right side. That is, when the center between the two mounting holes 31a and 31a of the mounting portion 31 of the airbag 30 is set to a mounting center MC, in the case of the embodiment, a center line ML in the front-rear direction passing through the mounting center MC is arranged offset to the right side of the center line BL passing through the center of the knee receiving portion 32 (see FIG. 5A to 5C). Such an offset of the center line ML to the right of the center line BL will occur in a case where, even when the center line BL passing through the center of the knee receiving portion 32 corresponding to a center (knee center) KC between the left and right knees KL and KR of a driver (occupant) M is arranged, depending on the arrangement of various devices and members around the knee protection airbag device KA in the vehicle, the arrangement position of the mounting portion 31 of the airbag 30 has to be shifted to the left or right (right in the embodiment) with respect to the center line BL (see FIG. 3).

Left and right end side portions 55 and 56 of a roll folding portion 53 obtained by roll-folding the airbag 30 are folded and overlapped with respect to the mounting center MC side in a central portion 54 near the center in the left-right direction of the roll folding portion 53 (see FIG. 7).

Figure 6:
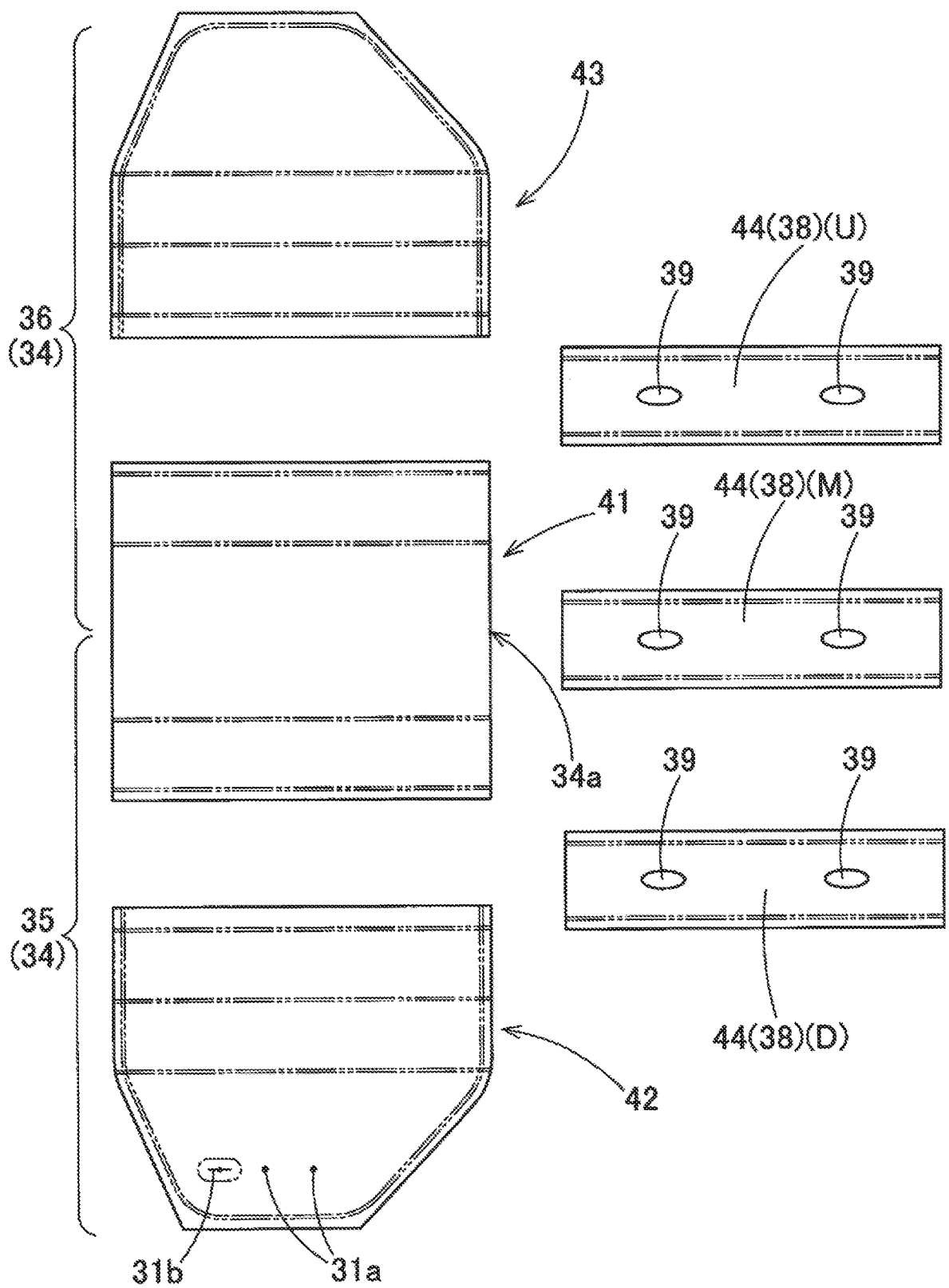
FIG. 6 is a diagram illustrating constituent materials of the airbag of the embodiment.

As illustrated in FIGS. 5A to 6, the components of the airbag 30 includes an upper end side base cloth 41 arranged in an inverted U shape on an upper end 34a side of the outer peripheral wall 34, a vehicle body side base cloth 42 and an occupant side base cloth 43 which extend downward from both ends (lower ends) of the upper end side base cloth 41 bent in an inverted U shape and are arranged to face each other, and tether base cloth 44 (U, M, D) forming each tether 38 (U, M, D). When manufacturing the airbag 30, the upper end side base cloth 41 is folded in two and the upper end sides of the vehicle body side base cloth 42 and the occupant side base cloth 43 are respectively sewn to both ends of the upper end side base cloth 41, and then the front and rear ends of each of the tether base cloths 44U, 44M, and 44D are sewn to the parts of the upper end side base fabric 41 which are folded in two and to face each other and the opposing vehicle body side base cloth 42 and occupant side base cloth 43, and further the occupant side wall portion 36 and the vehicle body side wall portion 35 are sewn together at their overlapping outer peripheral edges, in such a manner that the airbag 30 can be manufactured.

Figure 7A:
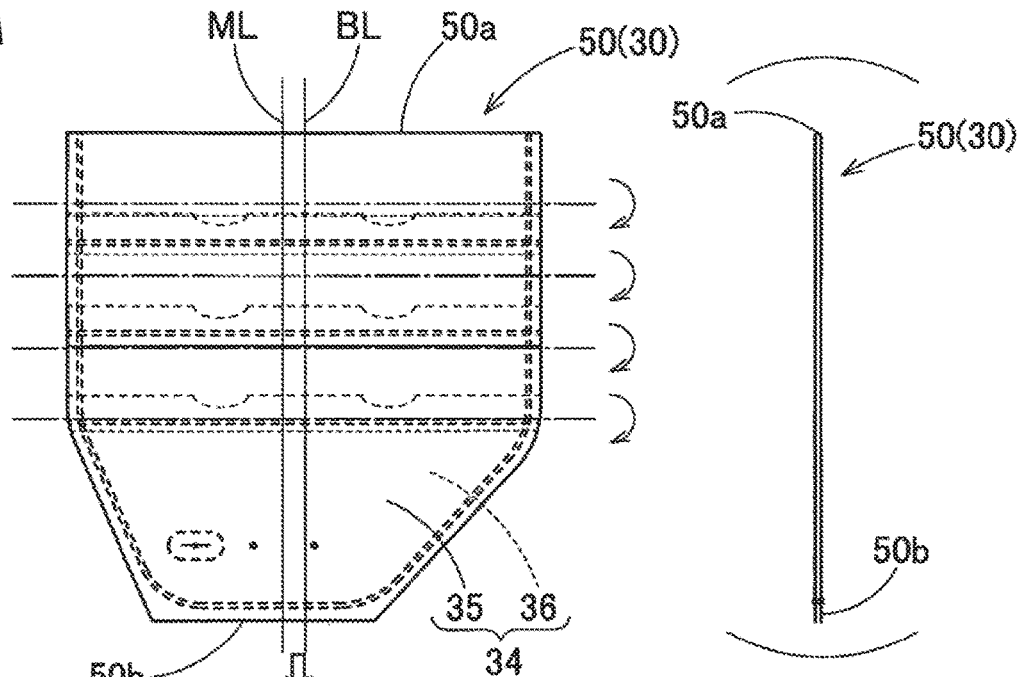
FIGS. 7A to 7C are diagrams illustrating a step of folding the airbag of the embodiment to form a folding completed body.
Figure 7B:
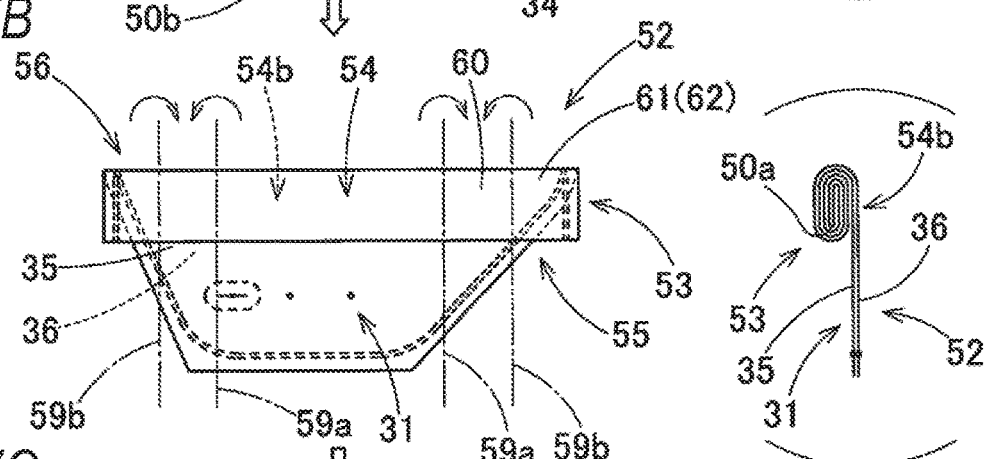
Figure 7C:
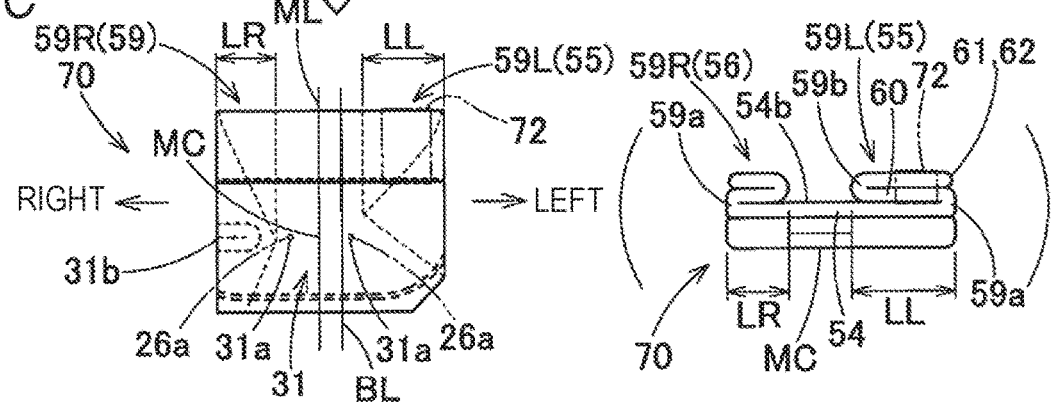

When the manufactured airbag 30 is folded and a folding completed body 70 which can be accommodated in the case 10 as the accommodation part is formed by disposing a tape material 72 as the joining unit, first, the airbag 30 is folded. As illustrated in FIGS. 7A and 7B, this folding forms an initial deployment body 50 in which the occupant side wall portion 36 and the vehicle body side wall portion 35 are overlapped and flatly expanded, and then roll-folding is performed on the vehicle body side wall portion 35 side so that an upper edge 50a side of the knee receiving portion 32 side approaches a lower edge 50b side of the mounting portion 31 side to form a roll folded body 52. Next, as illustrated in FIGS. 7B and 7C, the end side portions 55 and 56 on the left and right sides of the roll folding portion 53 in the roll folded body 52 are formed as folded portions 59 (L, R) on the side of the occupant side wall portion 36 with respect to the central portion 54 in the vicinity of the center in the left-right direction of the roll folding portion 53, and then the folded portions 59L and 59R are overlapped on a rear surface 54b of the central portion 54 of the roll folding portion 53.

In the case of the embodiment, the folded portions 59L and 59R are folded in the central portion 54 with two folds 59a and 59b, respectively. That is, each of the folded portions 59L and 59R includes a first overlapping portion 60 from the first fold 59a to the second fold 59b on the central portion 54 side and a tip side part 61 which extends to the tip side of the end side portions 55 and 56 in a row with the first overlapping portion 60. In the case of the embodiment, the tip side part 61 is folded on the rear surface side of the first overlapping portion 60 as a second overlapping portion 62. Further, in the folded portions 59L and 59R, the center line ML of the mounting portion 31 is displaced to the right side with respect to the center line BL of the airbag 30 and the left folded portion 59L has a longer horizontal dimension than the right folded portion 59R (the left-right length dimension LL of the left folded portion 59L>the left-right length dimension LR of the right folded portion 59R).

Figure 8A:
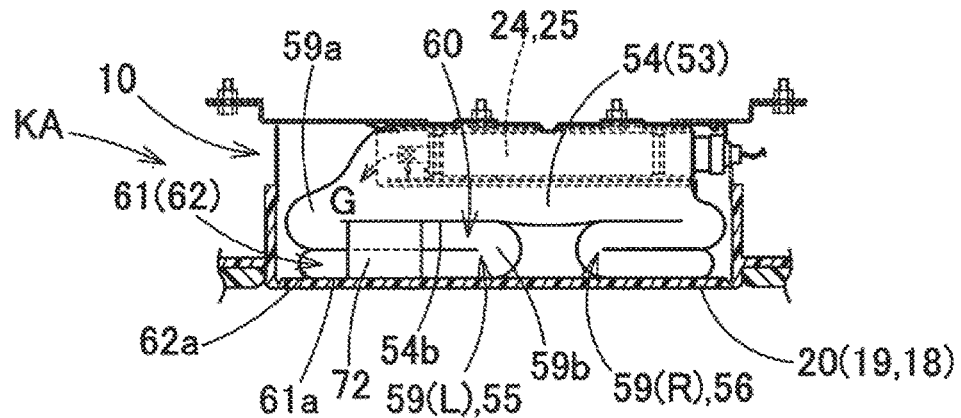
FIGS. 8A to 8C are diagrams for sequentially illustrating an operating state of the knee protection airbag device of the embodiment.
Figure 8B:
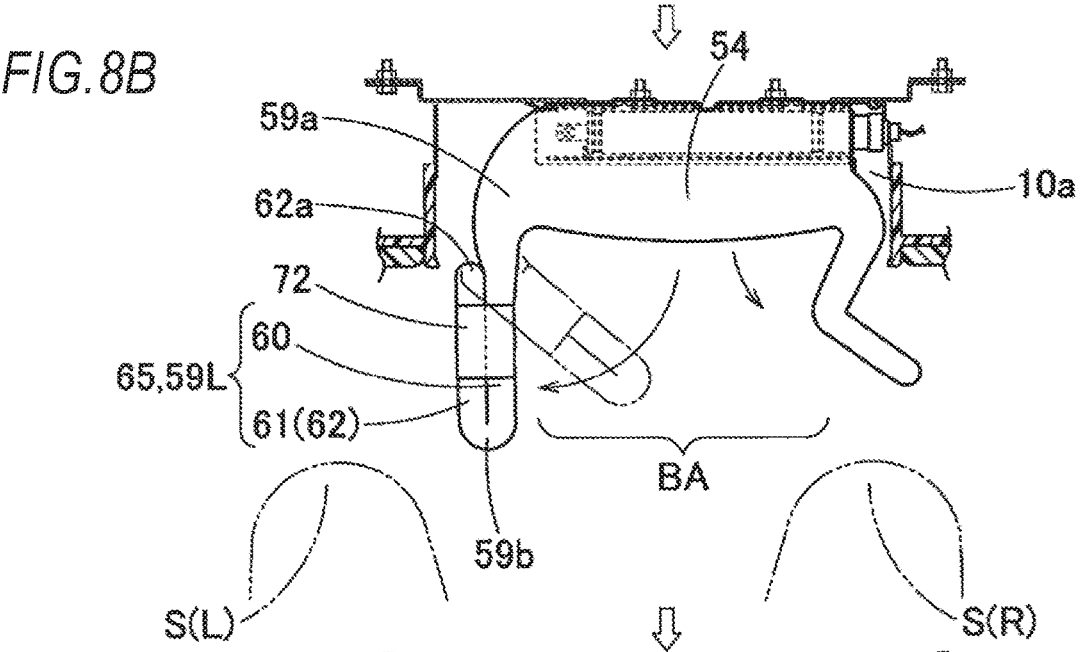
Figure 8C:
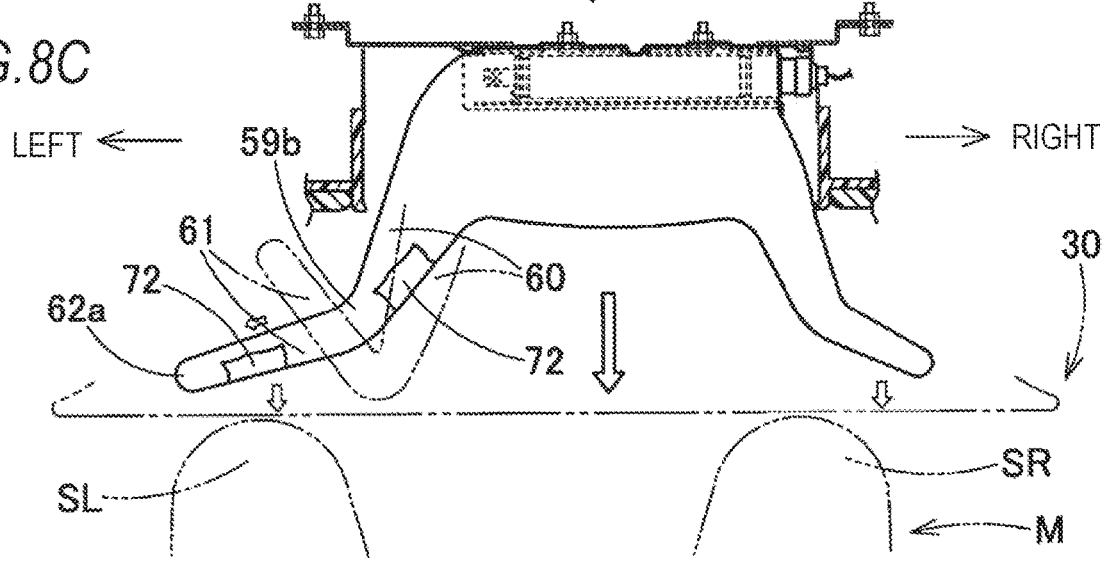

The tape material 72 as the joining unit is attached so as to wrap the entire circumference in the front-rear direction of the first overlapping portion 60 near the first fold 59a of the left folded portion 59L on the long dimension side and the tip side part 61. The tape material 72 is formed by applying an adhesive to a woven cloth made of threads such as polyester and polyamide, and is rupturable. In particular, regarding the breaking strength of this tape material 72, in other words, the joining strength wrapped to join the first overlapping portion 60 and the tip side part 61, the breaking strength of the tape material 72 is set such that, when the inflation gas G flows into the airbag 30, as illustrated in FIGS. 8A to 8C, the folding of the first fold 59a is canceled, and if the first overlapping portion 60 of the folded portion 59L comes out of a rear area BA of the central portion 54 of the roll folding portion 53, the joining of the first overlapping portion 60 and the tip side part 61 is released. The breaking strength of the tape material 72 will be described in more detail. The breaking strength of the tape material 72, that is, the joining strength between the first overlapping portion 60 and the tip side part 61 by the tape material 72 is set as follows. The inflation gas G is discharged from the gas discharge portion 25a of the inflator 24 and the inflation gas G flows to the central portion 54 of the roll folding portion 53 near the mounting portion 31, and thus the central portion 54 swells. Further, the inflation gas G flows into the first overlapping portion 60 side of the folded portion 59L so as to cancel the folding of the first fold 59a. Further, the inflation gas G flows into the tip side part 61 (second overlapping portion 62) so as to cancel the folding of the second fold 59b. However, it is set so that the breaking strength that can prevent the cancel of the folding of the second fold 59b to some extent can be secured. Then, the first overlapping portion 60 swells and the tip side part 61 also swells, and further it does not break until the tip side part 61 rotates away from the first overlapping portion 60 around the second fold 59b.

Then, by wrapping the tape material 72 and forming an integral swinging portion 65 by joining the first overlapping portion 60 of the folded portion 59L and the tip side part 61, the folding completed body 70 can be formed. After that, the folding completed body 70 is wrapped with a breakable wrapping film 47 (see FIG. 2) for preventing collapse.

Although not illustrated, when the airbag 30 is folded, the retainer 26 of the inflator 24 is accommodated in the airbag 30 by protruding the bolt 26a from the mounting hole 31a of the mounting portion 31. Then, when the folding complete body 70 is wrapped with the wrapping film 47, the bolt 26a is also projected from the wrapping film 47 in the region of the insertion hole 31b of the mounting portion 31.

After that, through the insertion hole 31b of the airbag 30, the main body 25 of the inflator 24 is inserted into the retainer 26, and the folding completed body 70 containing the inflator 24 is accommodated in the case 10. Next, the bolts 26a and 26a are projected from the mounting holes 11a of the bottom wall portion 11 and the nut 27 is fastened to each bolt 26a, in such a manner that the inflator 24 and the airbag 30 are fixedly attached to the case 10. Then, while arranging the design surface portion 19 of the airbag cover 18 so as to close the protruding opening 10a of the case 10, by fitting the mounting wall portion 22 around the peripheral wall portion 14 of the case 10 and inserting the hook 15 of the case 10 into the locking hole 22a of the mounting wall portion 22, the airbag device KA can be assembled.

In the case of the airbag device KA assembled in this way, when the mounting piece portion 12 of the case 10 is mounted against the mounting bracket 8 of the vehicle before mounting the instrument panel 6 and each bolt 9 is fastened to the nut 8a through the through-hole 12a, it is possible to attach the airbag device KA to the vehicle. Further, when the connector 28 with the lead wire 29 that can input the operation signal is attached to the main body 25 of the inflator 24, and further the instrument panel 6 is installed in the vehicle, the knee protection airbag device KA can be mounted on the vehicle.

After the airbag device KA is mounted on the vehicle, when the vehicle has a frontal collision or the like and the inflator 24 is activated, the inflation gas G is discharged from the gas discharge portion 25a, and the airbag 30 starts to inflate. Next, the folded portion 59 (L, R) consisting of the central portion 54 of the roll folding portion 53 and the end side portions 55 and 56 swells, pushes the door portions 20U and 20D of the airbag cover 18 open, and protrudes rearward from the protruding opening 10a of the case 10. Further, it is expanded so that the folded portion 59 (L, R) cancels the folds of the folds 59a and 59b, and then, in order to cancel the roll folding of the roll folding portion 53 as a whole, from the case 10 as the accommodation part of the airbag 30, it is expanded rearward and upward. Therefore, the knee receiving portion 32 will be located in front of the knee K of the driver M.

In this case, in the knee protection airbag device KA of the embodiment, at the start of inflation of the airbag 30, the central portion 54 of the roll folding portion 53 is inflated, and the end side portions 55 and 56 on both left and right sides are also trying to be inflated, and the folded portion 59 (L, R) is trying to expand left and right. At that time, as illustrated in FIGS. 8A and 8B, in the folded portion 59L on which the tape material 72 as the joining unit is mounted and which is long in the left-right direction and is folded in the central portion 54 with at least two folds 59a and 59b, until the first fold 59a is unfolded and the first overlapping portion 60 moves out of the rear area BA of the central portion 54, the tape material 72 as the joining unit maintains the folded state, and thus the tip side part 61 on the tip side of the end side portion 55 does not move rearward so as to separate from the first overlapping portion 60 side of the expanded folded portion 59L. Then, when the first overlapping portion 60 of the folded portion 59 is expanded so as to open to the left in the left-right direction so as to be out of the rear area BA of the central portion 54 of the roll folding portion 53, as illustrated in FIGS. 8B and 8C, the tape material 72 as the joining unit releases the joining of the first overlapping portion 60 and the tip side part 61, and thus the folding of the second fold 59b is canceled. As a result, the folded portion 59L itself expands a tip 62a side of the tip side part 61 to the left in the left-right direction. Therefore, after the folded portion 59L folded at the central portion 54 by providing at least two folds 59a and 59b is expanded in the left-right direction of the first overlapping portion 60 that accompanies the cancellation of the folding of the first fold 59a, the second fold 59b is canceled with the uncoupling of the tape material 72 as the joining unit. As a result, the tip side part 61 is expanded to the left in the left-right direction. Then, along with the central portion 54 of the roll folding portion 53, the end side portion 55 which includes the first overlapping portion 60 expanded in the left-right direction and the tip side part 61 cancels the roll folding and the knee receiving portion 32 is arranged on the front side of the knee K as illustrated by the chain double-dashed line in FIG. 1. That is, by the time the tape material 72 as the joining unit is released from the joining, the folded portion 59L is restrained from projecting to the rear and expanded widely in the left-right direction. Therefore, even when the driver's (occupant's) shin S (L, R) approaches the case 10 as the accommodation part, at the initial stage of inflation of the airbag 30, a tip 62a of the end side portion 55 of the folded portion 59L does not significantly protrude rearward in the rear area BA of the central portion 54 of the roll folding portion 53. Further, since the roll folding can be canceled in a state where the roll folding portion 53 is separated from the rear area BA of the central portion 54 to the left and right and widely expanded to the left and right, the knee receiving portion 32, which has been arranged in the central portion 54 of the roll folding portion 53 or the folded portion 59 (L, R) area, can be smoothly arranged in front of the knee K.

Figure 9A:
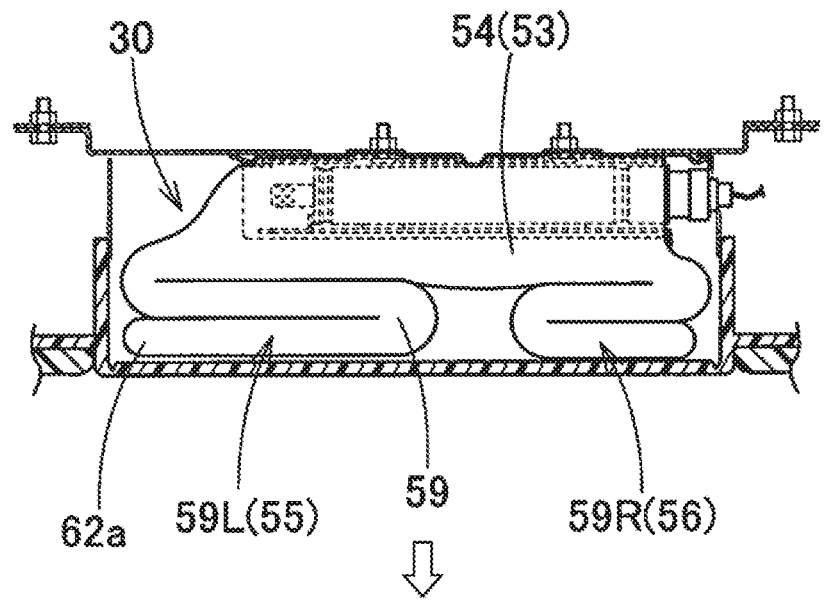
FIGS. 9A and 9B are diagrams illustrating an operating state of a knee protection airbag device of a comparative example.
Figure 9B:
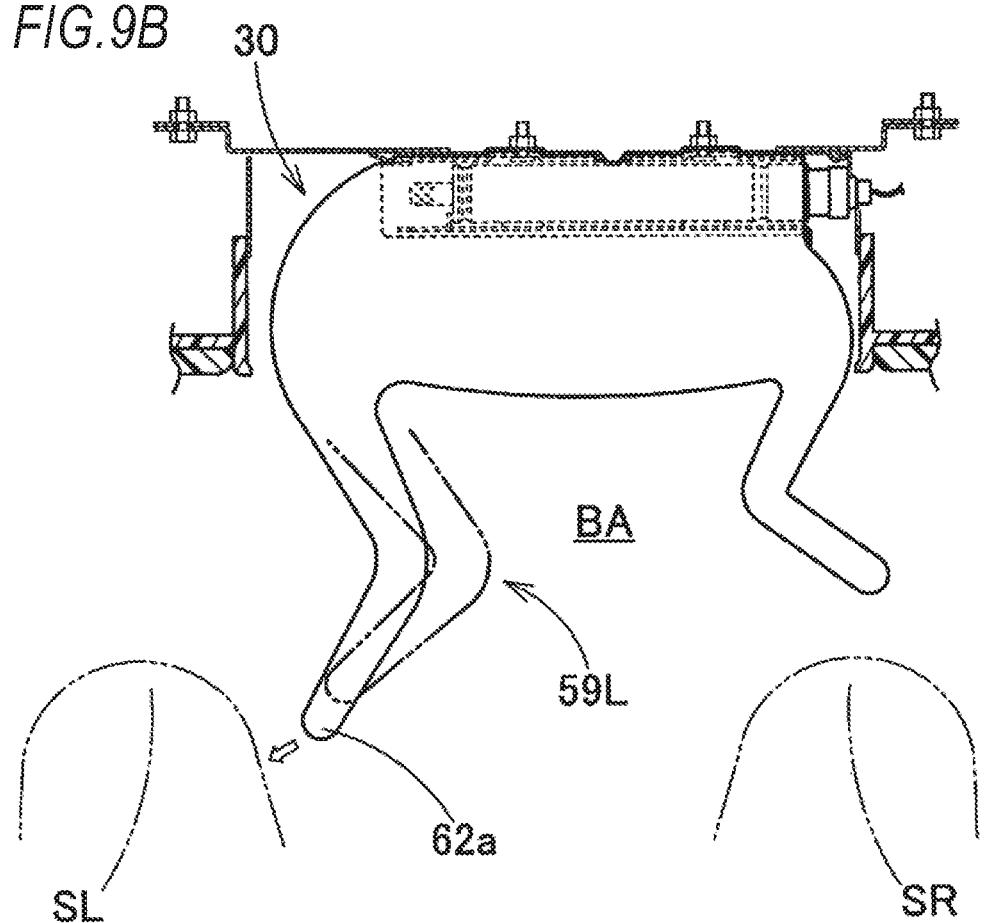

When the tape material 72 is not provided as the joining unit, as illustrated in FIGS. 9A and 9B, at the beginning of inflation of the airbag 30, the tip 62a of the end side portion 55 of the folded portion 59L behaves so as to project largely rearward in the rear area BA of the central portion 54 of the roll folding portion 53 and enter the back side of the left shin SL from between the approaching shin SL and SR. As a result, the knee receiving portion 32 cannot be smoothly arranged on the front side of the knee K.

In addition, the right folded portion 59R has a short left-right length dimension LR. Thus, even when it is not wrapped with the tape material 72, it can be expanded and inflated without causing the behavior such that the tip 62a enters the back side of the approaching shin SR.

Therefore, in the knee protection airbag device KA of the embodiment, the tape material 72 as the joining unit can suppress the amount of rearward protrusion of the end side portion 55 in the roll folding portion 53 of the airbag 30 at the initial stage of expansion.

As a result, in the embodiment, even when the shin S (L, R) of the driver (occupant) M approaches the case 10 as the accommodation part, the folded portions 59L and 59R of the roll folding portion 53 are smoothly expanded to the left and right sides on the front side of the shin S (L, R), and the roll folding of the roll folding portion 53 is canceled without any trouble. Therefore, the knee receiving portion 32 can be smoothly arranged on the front side of the knee K (L, R) and the knee receiving portion 32 can accurately receive the knee K (L, R).

Therefore, in the embodiment, one side of the left and right folded portions 59L and 59R of the folding completed body, in the embodiment, the left folded portion 59L side having a long length dimension LL in the left-right direction is provided with at least two folds 59a and 59b and is folded into the central portion 54 and the tape material 72 as the joining unit is provided, and further the folding completed body 70 is provided.

That is, of the left and right folded portions 59L and 59R of the folding completed body 70, before the deployment in the left-right direction at the beginning of inflation, only one side which needs to control the protrusion to the rear side may be provided with the tape 72 as the joining unit and the folding completed body 70 may be formed.

In the case of the embodiment, the airbag 30 at the time of completion of inflation is configured such that the mounting center MC, which is the center in the left-right direction of the mounting portion 31, is displaced from the center line BL in the front-rear direction passing through the center of the knee receiving portion 32 in the left-right direction to one side (right side in the embodiment) in the left-right direction. The left and right end side portions 55 and 56 of the roll folding portion 53 are folded with respect to the mounting center MC side in the central portion 54 of the roll folding portion 53 and formed as the folded portions 59 (L, R). The folded portion 59L of the folding completed body 70 on which the tape material 72 as the joining unit is provided is the portion on the side (left side) displaced from the mounting center MC by the center line BL.

In such a configuration, the airbag 30 at the time of completion of inflation displaces the mounting portion 31 from the center line BL passing through the center of the knee receiving portion 32 in the left-right direction to the left-right direction. In the left and right end side portions 55 and 56 of the roll folding portion 53, since the left end side portion 55 which is displaced away from the mounting center MC of the mounting portion 31 as one side has the length dimension LL made longer than the end side portion 56 on the other side (LL>LR), when the tape material 72 as the joining unit is arranged in the folded portion 59L of the end side portion 55 which is the one end side portion and has the long dimension LL, the folded portion 59L can be appropriately expanded in the left-right direction while suppressing the rearward protruding amount, and then expanded and inflated so as to unroll the roll folding. Therefore, in the knee protection airbag device KA with such a configuration, it is suitable in the case where, even when the knee receiving portion 32 of the airbag 30 is arranged in front of the center KC of the left and right knees KL and KR of the driver (occupant) M in the left-right direction, the mounting center MC of the mounting portion 31 of the airbag 30 cannot be placed in front of the knee center KC between the left and right knees KL and KR of the driver M.

Needless to say, the tape material 72 as the joining unit may be arranged not only on one folded portion 59L side of the left and right folded portions of the folding completed body 70, but also on both left and right folded portions 59L and 59R.

Regarding the joining unit, as in the embodiment, the joining unit may be configured such that the entire circumference along the front-rear direction of the first overlapping portion 60 of the folded portion 59L and the tip side part 61 are formed by wrapping with a breakable tape material 72 and the tape material 72 is set to a strength at which the first overlapping portion 60 and the tip side part 61 are broken at the time of releasing the joining.

Figure 10A:
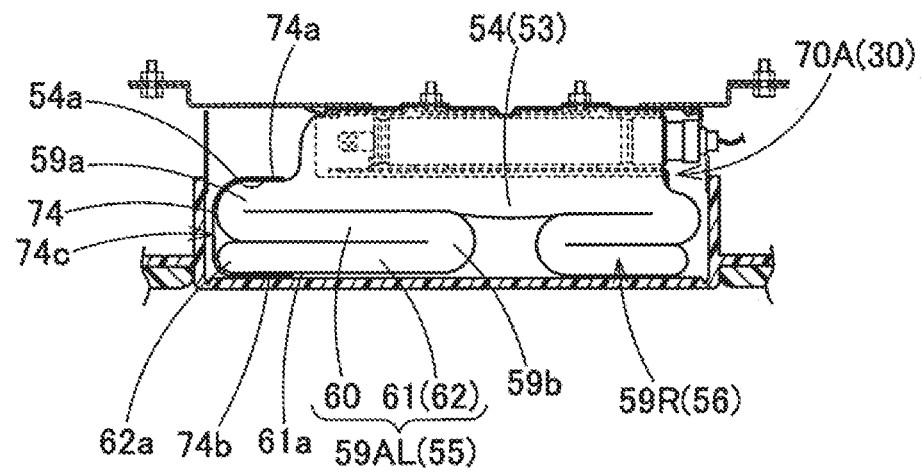
FIGS. 10A and 10B are views illustrating a modification example of joining unit used for the folding completed body of the airbag of the embodiment.
Figure 10B:
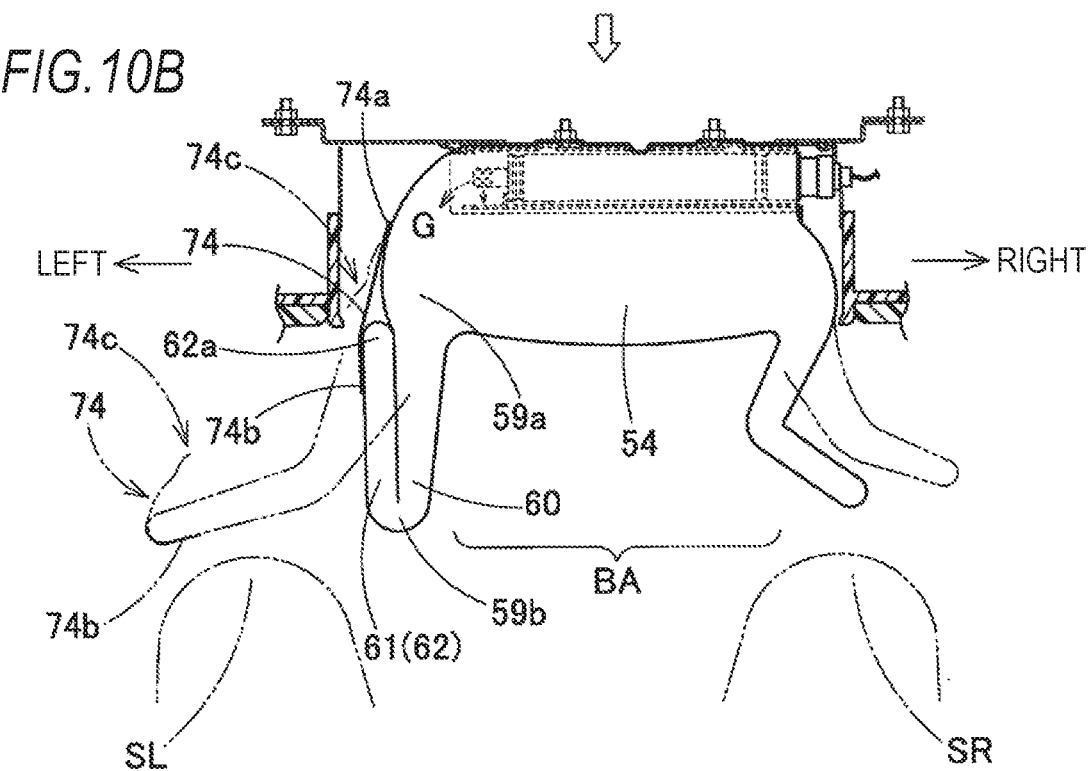

Also, as the joining unit, the joining unit may be configured such that, as illustrated in the folding completed body 70A in FIG. 10, it is formed by attaching the breakable tape material 74 from a front surface 54a side of the central portion 54 on the outer peripheral side of the first fold 59a to a rear surface 61a side of the folded portion 59AL and the tape material 74 is set to the strength at which it breaks when the first overlapping portion 60 and tip side part 61 are uncoupled.

For details, in the folding completed body 70A, a front end portion 74a of the tape material 74 is attached and arranged on the front surface 54a side of the central portion 54 near the first fold 59a and the rear end portion 74b is attached and arranged on the rear surface 61a side beyond the tip 62a of the second overlapping portion 62 as the tip side part 61. The tape material 74 is formed of the same material as the tape material 72 of the embodiment and the end side portion 55 is folded to form a folded portion 59AL and then attached. Further, the other configuration of the folding completed body 70A is the same as that of the folding completed body 70 of the embodiment, including the right folded portion 59R.

In this folding completed body 70A, when the airbag 30 starts to inflate, while the central portion 54 of the roll folding portion 53 swells, the end portions 55 and 56 on both the left and right sides also try to swell, and the folded portions 59AL and 59R try to expand left and right. In the folded portion 59AL which is long in the left-right direction and is folded in the central portion 54 by providing two folds 59a and 59b, until the folding of the first fold 59a is canceled and the first overlapping portion 60 comes out of the rear area BA of the central portion 54, by the tape material 74 as the joining unit which joins the tip 62a side to the central portion 54 side, the folded state is maintained, and the tip side part 61 on the tip side of the end side portion 55 does not move rearward so as to separate from the first overlapping portion 60 side of the expanded folded portion 59AL. Then, when the first overlapping portion 60 of the folded portion 59AL is expanded so as to open to the left in the left-right direction so as to be separated from the rear area BA of the central portion 54 of the roll folding portion 53, after that, due to the behavior of leaving the first overlapping portion 60 on the tip 62a side, the vicinity of an intermediate portion 74c of the tape material 74 is broken and the folding of the second fold 59b is canceled, and thus the folded portion 59AL itself unfolds the tip 62a side of the tip side part 61 to the left in the left-right direction. Therefore, even when the shin S (L, R) approaches the case 10, without any hindrance, along with the central portion 54 of the roll folding portion 53, the end side portion 55 which includes the first overlapping portion 60 and the tip side part 61 which are expanded in the left-right direction cancels the folding of the roll folding. Therefore, in the airbag 30, the knee receiving portion 32 is arranged on the front side of the knee K (see the chain double-dashed line in FIG. 1).

The folded portion 59R formed of the end side portion 56 on the right side of the folding completed body 70A is in the same folded state as the folding completed body 70 of the embodiment. The folded portion 59R is expanded in the same manner as the folded portion 59R of the folding completed body 70, and the folding of the roll folding is canceled together with the central portion 54 of the roll folding portion 53 and the folded portion 59AL.

Figure 11A:
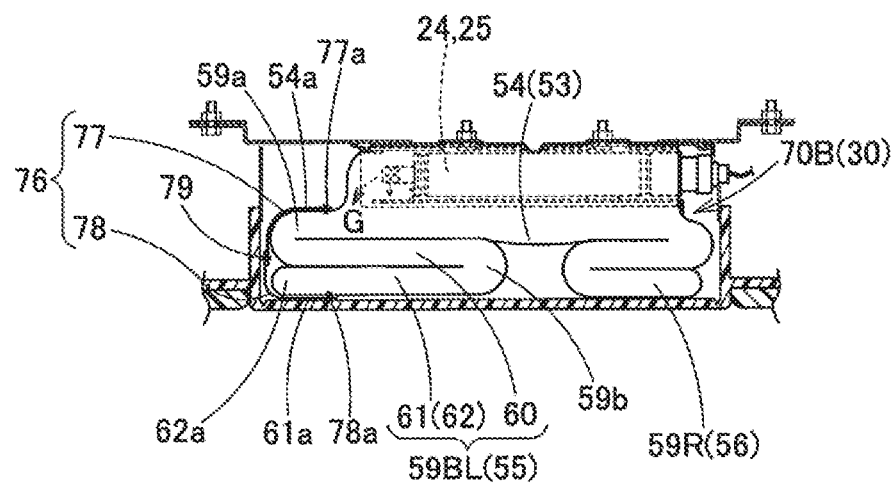
FIGS. 11A and 11B are views illustrating another modification example of the joining unit used for the folding completed body of the airbag of the embodiment.
Figure 11B:
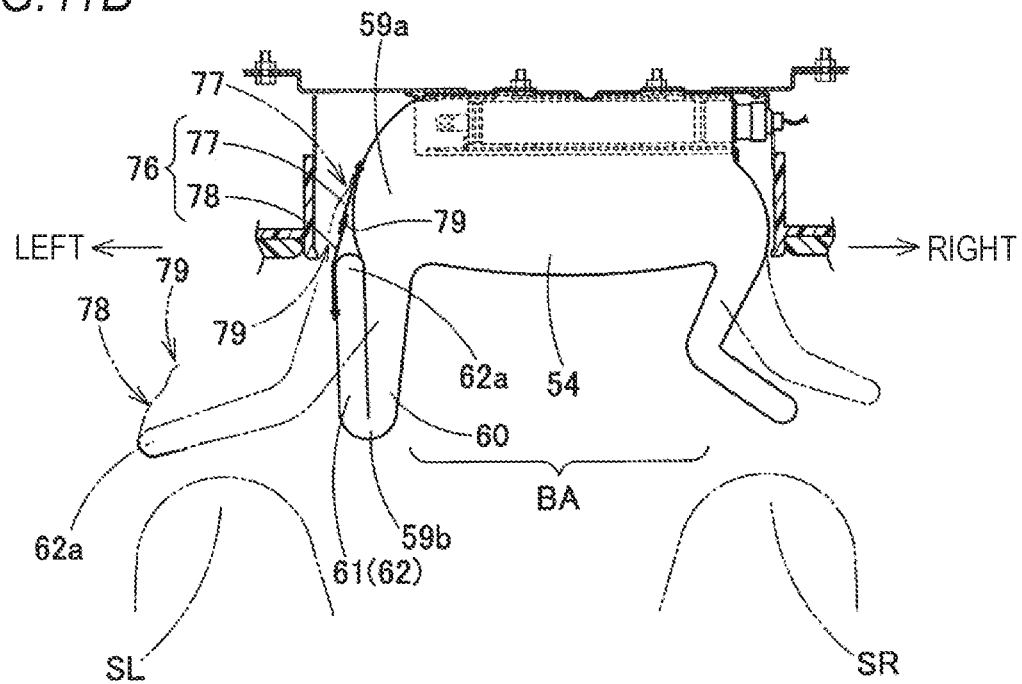

Further, as the joining unit, as shown in the folding completed body 70B illustrated in FIGS. 11A and 11B, on the front surface 54a side of the central portion 54 and on the rear surface 61a side of the folded portion 59BL in the outer circumferential side of the first fold 59a, the sheet material 76 made of a flexible cloth or the like having both ends sewn together is provided and the sheet material 76 is provided with the breakable portion 79, which breaks when the joining between the first overlapping portion 60 and tip side part 61 is released, in the vicinity of an intermediate portion between the sutured portions 77a and 78a to the front surface 54a side of the central portion 54 and the rear surface 61a side of the folded portion 59BL, in such a manner that the joining unit may be regulated.

Specifically, on the folded portion 59BL side of this folding completed body 70B, a sheet material 76 is configured of two sheets, a front side portion 77 and a rear side portion. Further, the front end side of the front side portion 77 is sewn to the front surface 54a side of the central portion 54 as a sewn portion 77a and the rear end side of a rear side portion 78 is sewn to the rear surface 61a side beyond the tip 62a of the tip side part 61 as the sewn portion 78a. The front side portion 77 and the rear side portion 78 of the sheet material 76 are sewn together at their ends to form the sheet material 76, and the sutured portions are made into the breakable portion 79. The sheet material 76 is previously sewn the sewn portions 77a and 78a of the front side portion 77 and the rear side portion 78 to a predetermined portion of the airbag 30. Then, after the end side portion 55 is folded to form the folded portion 59AL, the sutured portion 79 is formed to sew the end portions of the front side portion 77 and the rear side portion 78 to each other. Further, the other configuration of the folding completed body 70B is the same as that of the folding completed body 70 of the embodiment, including the right folded portion 59R.

In this folding completed body 70B, when the airbag 30 starts to expand, while the central portion 54 of the roll folding portion 53 swells, the end side portions 55 and 56 on both the left and right sides also try to swell, and the folded portions 59BL and 59R try to expand left and right. In the folded portion 59BL which is long in the left-right direction and is folded in the central portion 54 by providing two folds 59a and 59b, until the folding of the first fold 59a is canceled and the first overlapping portion 60 comes out of the rear area BA of the central portion 54, the folded state is maintained by the sheet material 76 as the joining unit which joins the tip 62a side to the central portion 54 side and the tip side part 61 on the tip side of the end side portion 55 does not move rearward so as to separate from the first overlapping portion 60 side of the expanded folded portion 59BL. Then, when the first overlapping portion 60 of the folded portion 59BL is expanded so as to open to the left in the left-right direction so as to be removed from the rear area BA of the central portion 54 of the roll folding portion 53, after that, due to the behavior of trying to separate from the first overlapping portion 60 on the tip 62a side, the sutured portion 79 as the breakable portion of the sheet material 76 is broken, and the fold of the second fold 59b is canceled. As a result, the folded portion 59BL itself unfolds the tip 62a side of the tip side part 61 to the left in the left-right direction. Therefore, even when the shin S (L, R) approaches the case 10, without any hindrance, along with the central portion 54 of the roll folding portion 53, the end side portion 55 which includes the first overlapping portion 60 and the tip side part 61 which are expanded in the left-right direction cancels the folding of the roll folding. As a result, in the airbag 30, the knee receiving portion 32 is arranged on the front side of the knee K (see the chain double-dashed line in FIG. 1).

Even in this folding completed body 70B, the folded portion 59R configured of the right side end side portion 56 is in the same folded state as the folding completed body 70 of the embodiment. The folded portion 59R is expanded in the same manner as the folded portion 59R of the folding completed body 70 and the folding of the roll folding is canceled together with the central portion 54 of the roll folding portion 53 or the folded portion 59BL.

Also, as the breakable portion of the sheet material 76, it may be formed by adhesion instead of stitching, and further, a slit or the like may be provided in the front side portion 77 or the rear side portion 78 in the vicinity thereof instead of the sutured portion, and that portion may be made into a breakable portion.

Furthermore, as the joining unit, like the folding completed body 70C illustrated in FIGS. 12A and 12B, it is formed from a locking member 81 including a shaft portion 81c penetrated by the first overlapping portion 60 and the tip side part 61 and locking head portions 81a and 81b which are provided at both ends of the shaft portion 81c and are locked to the front side of the first overlapping portion 60 and the tip side part 61 and the locking member 81 is set to have such strength that the locking head portions 81a and 81b are separated so as to be separated from each other when the joining between the first overlapping portion 60 and the tip side part 61 is released, in such a manner that the joining unit may be formed.

For details, on a folded portion 59CL side of the folding completed body 70C, it is disposed such that the locking member 81 made of a synthetic resin such as polypropylene has the enlarged locking head portions 81a and 81b at both ends of the small-diameter shaft portion 81c which is penetrated by the first overlapping portion 60 and the tip side part 61 and the locking head portion 81a locks the surface (front surface) 60a on the central portion 54 side of the first overlapping portion 60, and further the locking head portion 81b locks the rear surface 61a on the side away from the central portion 54 of the tip side part 61. The locking member 81 is prepared in a state where one head portion 81a or the head portion 81b side is formed and the other head portion 81b or 81a is not formed. Next, when folding the end side portion 55 of the roll-folded roll folding portion 53 to the central portion 54 side, the first overlapping portion 60 and tip side part 61 folded at the second fold 59b are passed through the end portion side of the shaft portion 81c where the locking head portions 81b and 81a are not provided and the end of the shaft portion 81c is expanded to the penetrating tip by melting and the like to form the locking head portions 81b and 81a, and then the locking head portion 81a locks a front surface 60a on the central portion 54 side of the first overlapping portion 60 and the locking head portion 81b locks the rear surface 61a on the side away from the central portion 54 of the tip side part 61. Further, the other configuration of the folding completed body 70C is the same as that of the folding completed body 70 of the embodiment, including the right folded portion 59R.

In this folding completed body 70C, when the airbag 30 starts to expand, while the central portion 54 of the roll folding portion 53 swells, the end side portions 55 and 56 on both the left and right sides also try to swell, and thus the folded portions 59CL and 59R try to expand to the left and right. Then, in the folded portion 59CL which is long in the left-right direction and is folded in the central portion 54 by providing two folds 59a and 59b, until the folding of the first fold 59a is canceled and the first overlapping portion 60 comes out of the rear area BA of the central portion 54, the folded state is maintained by the locking member 81 as the joining unit which joins the tip 62a side to the first overlapping portion 60 on the central portion 54 side and the tip side part 61 on the tip side of the end side portion 55 does not move rearward so as to separate from the first overlapping portion 60 side of the expanded folded portion 59CL. Then, when the first overlapping portion 60 of the folded portion 59CL is expanded so as to open to the left in the left-right direction so as to be removed from the rear area BA of the central portion 54 of the roll folding portion 53, after that, due to the behavior of trying to move away from the first overlapping portion 60 on the tip 62a side, the vicinity of the shaft 81c of the locking member 81, specifically, the shaft portion 81c near the locking head portions 81a and 81b where stress concentration easily occurs, breaks. Therefore, the locking head portions 81a and 81b are divided so as to be separated from each other, and thus the folding of the second fold 59b is removed. As a result, the folded portion 59CL itself is expanded leftward in the left-right direction on the tip 62a side of the tip side portion 61. Therefore, even when the shin S (L, R) approaches the case 10, without any hindrance, along with the central portion 54 of the roll folding portion 53, the end side portion 55 which includes the first overlapping portion 60 which is expanded in the left-right direction and the tip side part 61 cancels the folding of the roll folding. Therefore, in the airbag 30, the knee receiving portion 32 is arranged on the front side of the knee K (see the chain double-dashed line in FIG. 1).

Even in this folding completed body 70C, the folded portion 59R configured of the right side end side portion 56 is in the same folded state as the folding completed body 70 of the embodiment. The folded portion 59R is unfolded in the same manner as the folded portion 69R of the folding completed body 70, and together with the central portion 64 of the roll folding portion 63 and the folded portion 69AL, the folding of the roll folding is canceled.

Figure 13A:
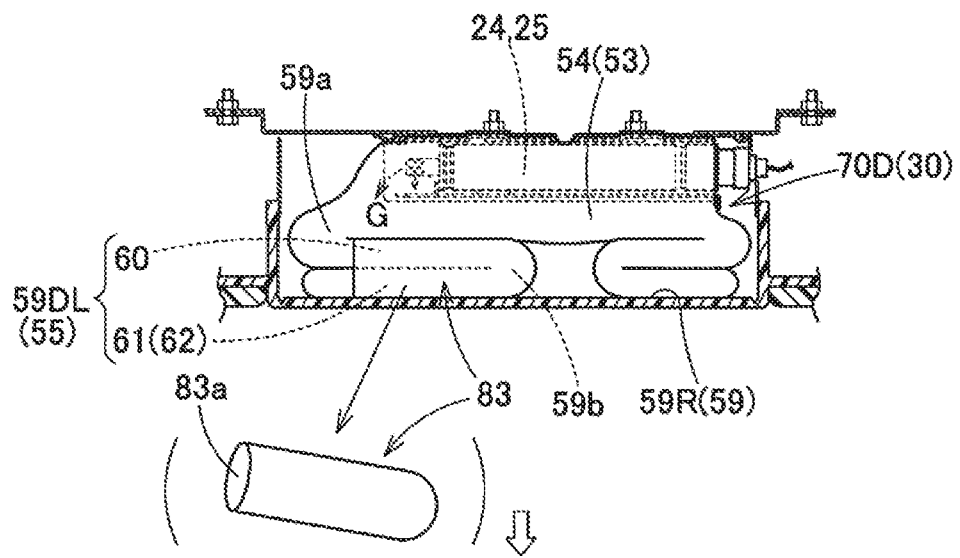
FIGS. 13A and 13B are views illustrating still another modification example of the joining unit used for the folding completed body of the airbag of the embodiment.
Figure 13B:
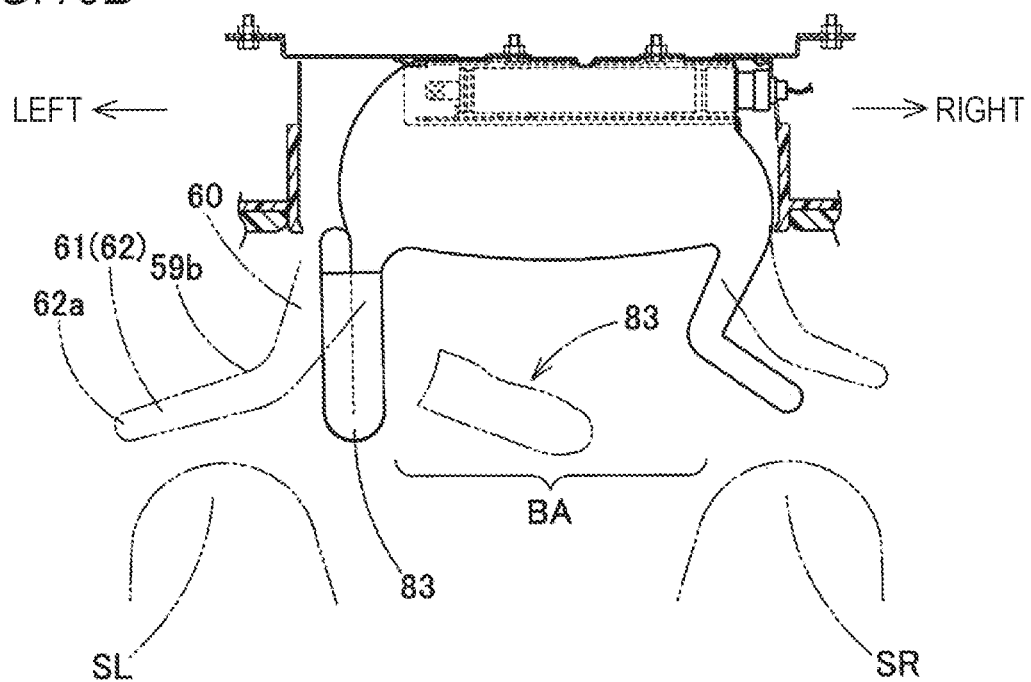

Further, as the joining unit, as shown in the folding completed body 70D illustrated in FIGS. 13A and 13B, it is formed of a cover 83 for fitting the folded portion 59DL so as to wrap the folded portion 59DL from around the second fold 59b and the cover 83 is set to a fitting strength that it deviates from the folded portion 59DL when the joining between the first overlapping portion 60 and the tip side part 61 are removed, in such a manner that the joining unit may be formed.

Specifically, in this folding completed body 70D, the cover 83 made of a flexible cloth or the like has a bag shape having the opening 83a that can wrap the folded portion 59DL from around the second fold 59b. The cover 83 is arranged so that when the end side portion 55 is folded to form the folded portion 59DL, the vicinity of the second fold 59b is fitted from the opening 83a to wrap the folded portion 59DL. Further, the other configuration of the folding completed body 70D is the same as that of the folding completed body 70 of the embodiment, including the right folded portion 59R.

In this folding completed body 70D, when the airbag 30 starts to expand, while the central portion 54 of the roll folding portion 53 swells, the end side portions 55 and 56 on both the left and right sides try to expand, and thus the folded portions 59DL and 59R try to expand left and right. In the folded portion 59DL which is long in the left-right direction and is folded in the central portion 54 by providing two folds 59a and 59b, until the folding of the first fold 59a is canceled and the first overlapping portion 60 comes out of the rear area BA of the central portion 54, by the cover 83 as the joining unit which wraps the first overlapping portion 60 and the tip side part 61 from around the second fold 59b, the folded state is maintained and the tip side part 61 on the tip side of the end side portion 55 does not move rearward so as to separate from the first overlapping portion 60 side of the expanded folded portion 59DL. Then, when the first overlapping portion 60 of the folded portion 59DL is expanded so as to open to the left in the left-right direction so as to be removed from the rear area BA of the central portion 54 of the roll folding portion 53, after that, due to the behavior of trying to move away from the first overlapping portion 60 on the tip 62a side, the cover 83 is removed from the vicinity of the second fold 59b and the joining between the first overlapping portion 60 and the tip side part 61 is released. As a result, the folding of the second fold 59b is removed, and thus the folded portion 59DL itself expands the tip 62a side of the tip side part 61 to the left in the left-right direction. Therefore, even when the shin S (L, R) approaches the case 10, without any hindrance, along with the central portion 54 of the roll folding portion 53, the end side portion 55 which includes the first overlapping portion 60 which is expanded in the left-right direction and the tip side part 61 cancels the folding of the roll folding. As a result, in the airbag 30, the knee receiving portion 32 is arranged on the front side of the knee K (see the chain double-dashed line in FIG. 1).

The folded portion 59R formed of the end side portion 56 on the right side of the folding completed body 70D is also in the same folded state as the folding completed body 70 of the embodiment. Further, the folded portion 59R is expanded in the same manner as the folded portion 59R of the folding completed body 70, and together with the central portion 54 of the roll folding portion 53 and the folded portion 59AL, the folding of the roll folding is canceled.

Also, the cover 83 may have a substantially cylindrical shape by wrapping the first overlapping portion 60 and the tip side part 61 from the vicinity of the second fold 59b and may have an opening on the second fold 59b side in addition to the opening 83a.

Further, in the knee protection airbag device KA of the embodiment, the case where the folded portion 59L of the folding completed body 70 is configured to include the first overlapping portion 60 and the second overlapping portion 62 as the tip side part 61 that is folded back by the second fold 59b and overlaps the first overlapping portion 60 is exemplified. However, a third overlapping portion 63 may be provided as in the folding completed bodies 70E and 70F of the airbag device KA illustrated in FIGS. 14A to 15B.

Figure 14A:
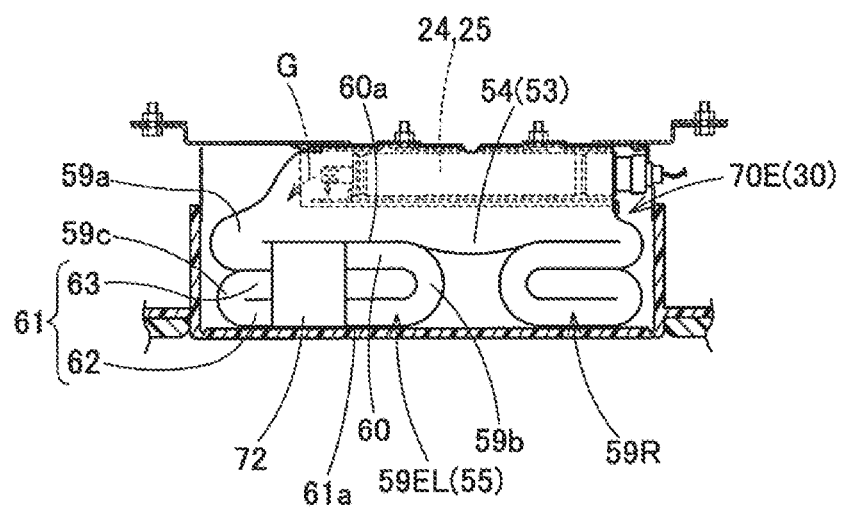
FIGS. 14A and 14B are diagrams illustrating a modification example of a folded portion of the folding completed body of the airbag of the embodiment.
Figure 14B:
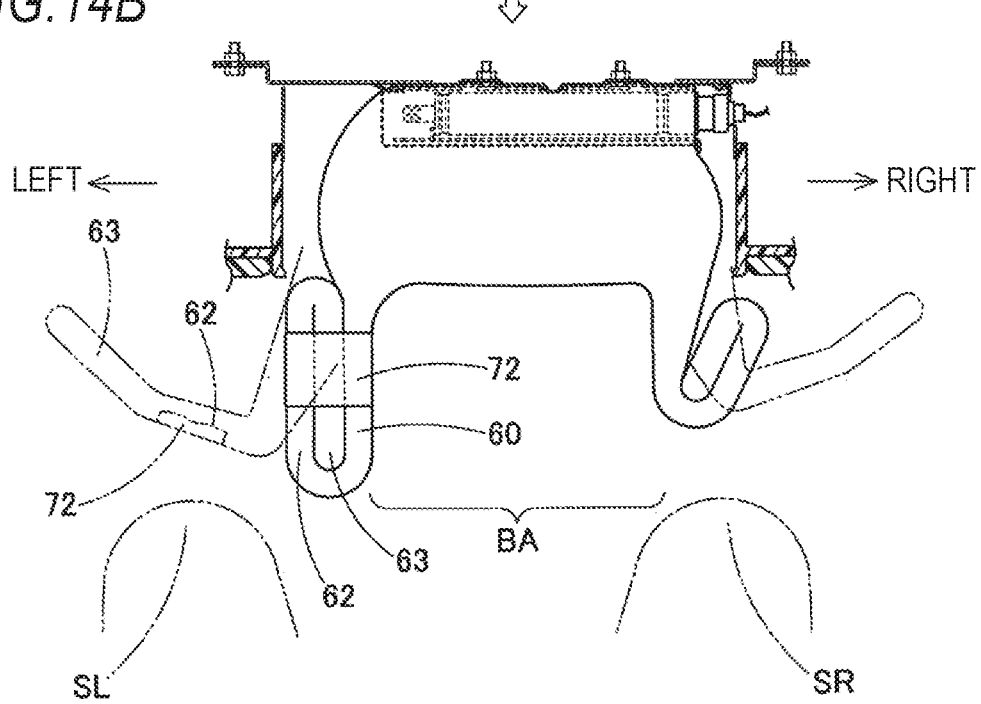

That is, in the folded portion 59EL of the folding completed body 70E illustrated in FIGS. 14A and 14B, the tip side part 61, which continues to the first overlapping portion 60 and extends to the tip side of the end side portion 55, has a third fold 59c at the end of the second fold 59b and includes the second overlapping portion 62 extending from the second fold 59b to the third fold 59c and a third overlapping portion 63 extending from the third fold 59c. The third overlapping portion 63 is arranged between the first overlapping portion 60 and the second overlapping portion 62.

Figure 16A:
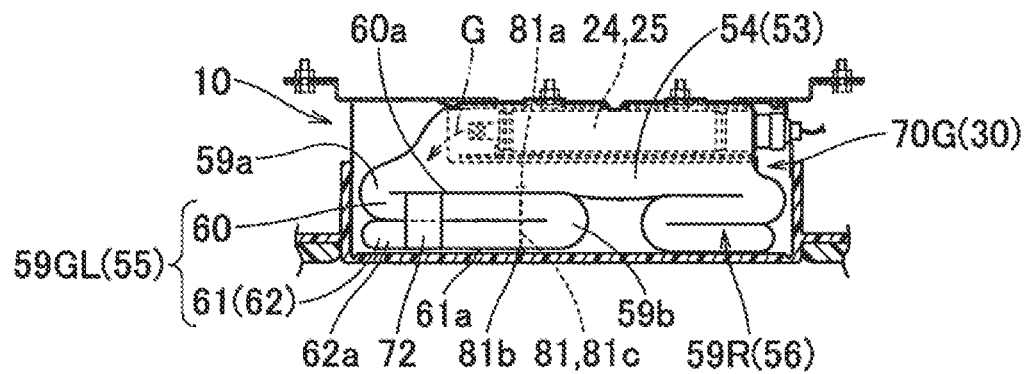
FIGS. 16A to 16C are views illustrating still another modification example of the joining unit used for the folding completed body of the airbag of the embodiment.
Figure 16B:
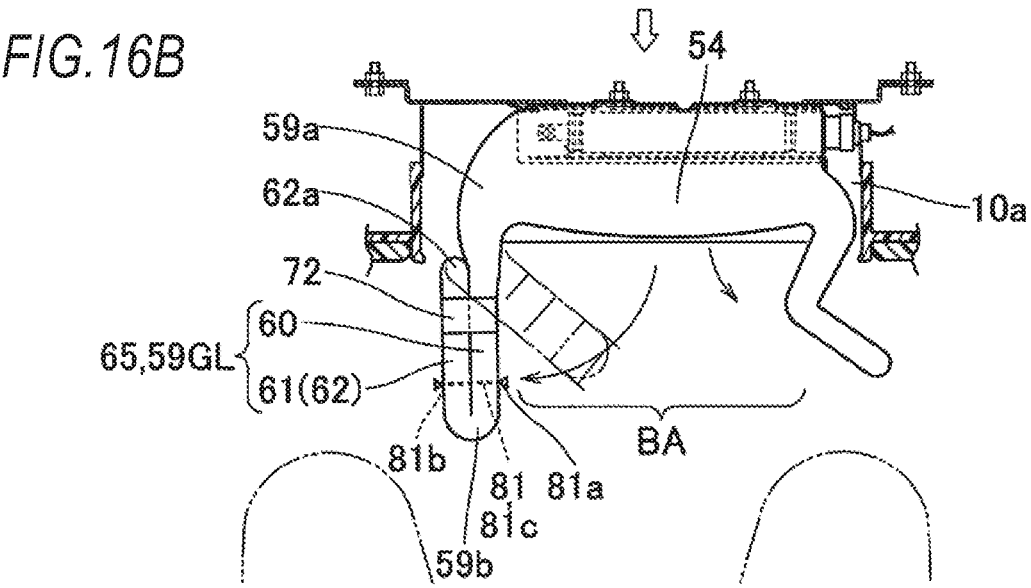
Figure 16C:
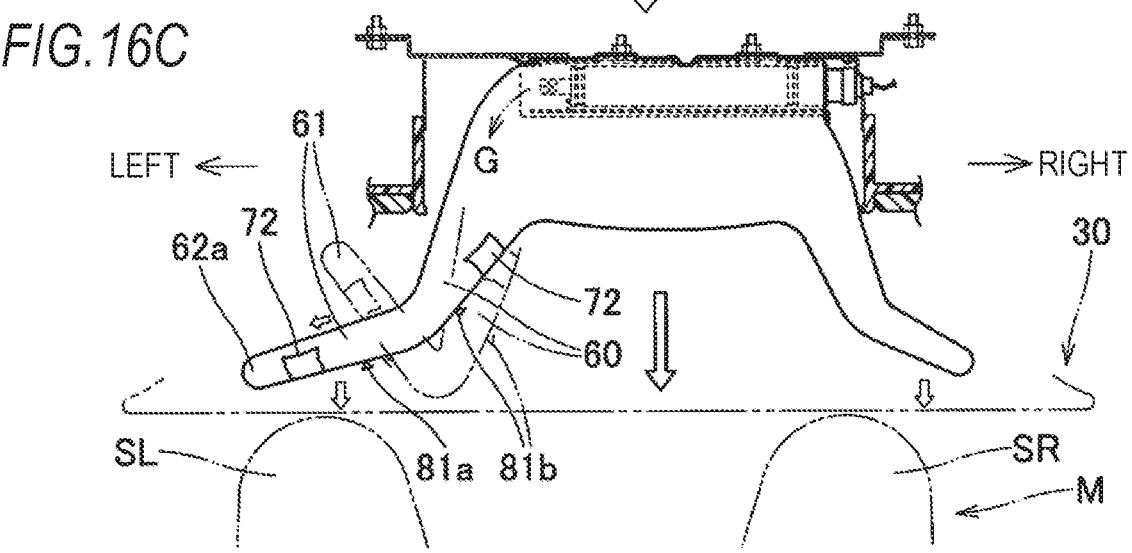

Also, in the folding completed body 70F illustrated in FIGS. 16A to 16C, the third overlapping portion 63 is disposed so as to be overlapped on a side of the second overlapping portion 62 overlapped with the first overlapping portion 60, which is the side away from the first overlapping portion 60.

Also, in the folding completed bodies 70E and 70F, the first overlapping portion 60 and the tip side part 61 are wrapped and joined by the tape material 72 as the joining unit, as in the embodiment. Needless to say, the bond strength of tape material 72 is set such that, when the inflation gas flows into the airbag 30, if the fold of the first fold 59a is canceled and the first overlapping portion 60 moves out of the rear area BA of the central portion 54, the joining between first overlapping portion 60 and the tip side part 61 is released.

In addition, as the joining unit used for the folding completed bodies 70E and 70F, in addition to the tape material 72 of the embodiment, the tape 74, the sheet material 76, the locking member 81, and the cover 83 shown in FIGS. 10A to 13B may be used.

Figure 15A:
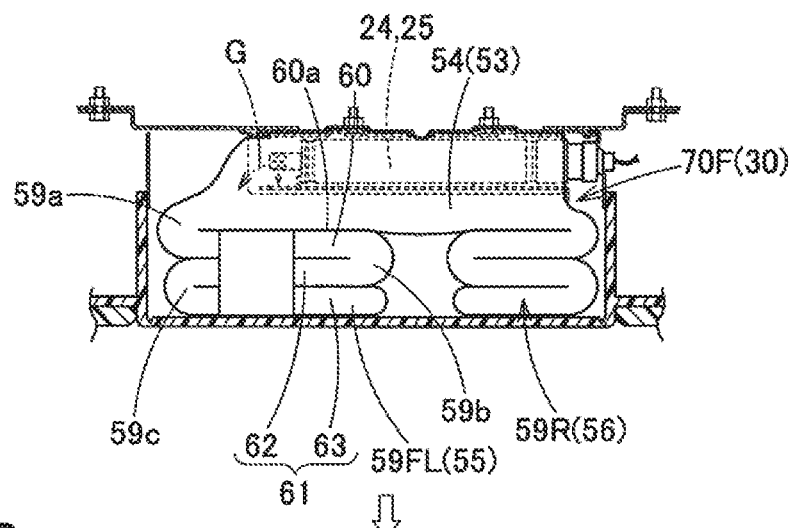
FIGS. 15A and 15B are diagrams illustrating another modification example of the folded portion of the folding completed body of the airbag of the embodiment.
Figure 15B:
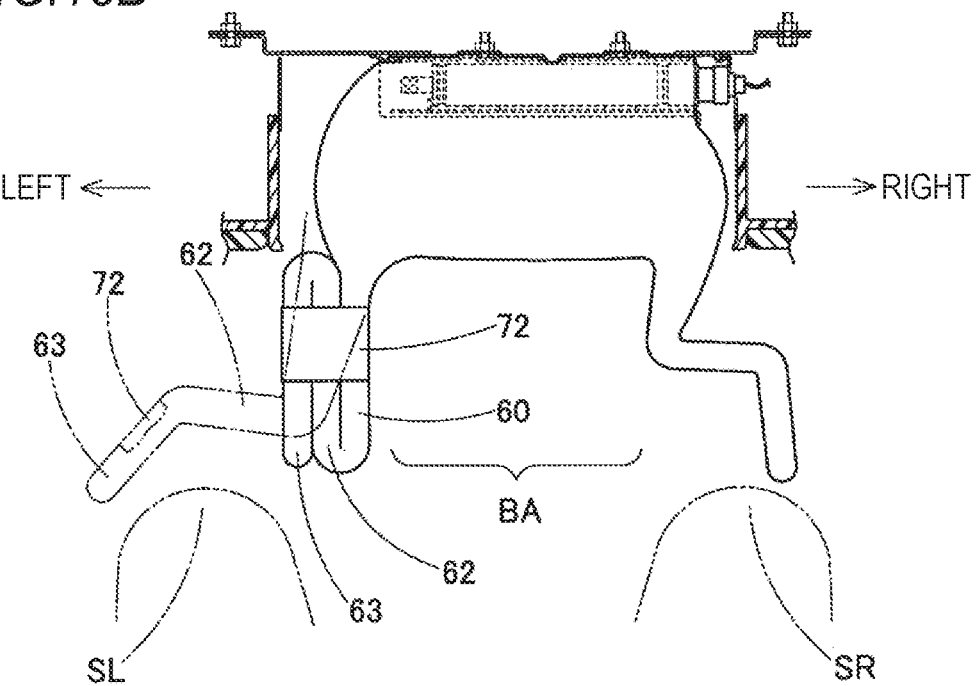

Also, as the first overlapping portion 60 and the tip side part 61 which are joined by the joining unit, in the folding completed body 70F illustrated in FIGS. 15A and 15B, it may be configured such that only the first overlapping portion 60 and the second overlapping portion 62 of the tip side part 61 are joined by the joining material such as the tape material 72 and the third overlapping portion 63 simply overlaps the second overlapping portion 62 without being joined.

Furthermore, the tape materials 72 and 74, the sheet material 76, the locking member 81, and the cover 83 as the above-described joining unit may appropriately use a plurality of the same materials or a combination of different materials.

For example, the folding completed body 70G of the airbag 30 illustrated in FIGS. 16A to 16C uses the tape material 72 and the locking member 81 as the joining unit. The tape material 72 is the same as the one used for the folding completed body 70 illustrated in FIGS. 8A to 8C and the tape material 72 wraps the entire circumference of the folded portion 59GL in the front-rear direction and can be broken when the joining between the first overlapping portion 60 and the tip side part 61 is released. The locking member 81 is the same as that used for the folding completed body 70C illustrated in FIGS. 12A and 12B, the locking member 81 includes the shaft portion 81c which is penetrated by the first overlapping portion 60 and the tip side part 61 and the locking head portions 81a and 81b which are provided at both ends of the shaft portion 81c and are locked to the front side of the first overlapping portion 60 and the tip side part 61. The locking member 81 can be divided so as to separate the locking head portions 81a and 81b from each other when the joining between the first overlapping portion 60 and the tip side part 61 is released.

In this folding completed body 70G, when the airbag 30 starts to expand, until the folding of the first fold 59a is canceled and the first overlapping portion 60 comes out of the rear area BA of the central portion 54, the long folded portion 59GL is kept in a folded state by the tape material 72 and the locking member 81 as a joining unit which joins the tip side part 61 to the first overlapping portion 60 and the tip side part 61 on the tip side of the end side portion 55 does not move rearward so as to separate from the first overlapping portion 60 side of the expanded folded portion 59GL. Then, if the first overlapping portion 60 of the folded portion 59GL is expanded so as to open to the left in the left-right direction so as to be out of the rear area BA of the central portion 54 of the roll folding portion 53, after that, due to the behavior of trying to separate from the first overlapping portion 60 on the tip 62a side, the tape material 72 breaks and the vicinity of the shaft portion 81c of the locking member 81, more specifically, the shaft portion 81c near the locking head portions 81a and 81b where stress concentration is likely to occur, is broken. As a result, the locking head portions 81a and 81b are divided so as to be separated from each other. Then, the folding of the second fold 59b is released and the folded portion 59GL itself expands the tip 62a side of the tip side part 61 to the left in the left-right direction. Therefore, even when the shin S (L, R) approaches case 10, without any hindrance, along with the central portion 54 of the roll folding portion 53, the end side portion 55 which includes the first overlapping portion 60 and the tip side part 61 that are expanded in the left-right direction cancels the folding of the roll folding. As a result, in the airbag 30, the knee receiving portion 32 is arranged on the front side of the knee K (see the chain double-dashed line in FIG. 1).

In this folding completed body 70G, since the tape material 72 and the locking member 81 are used together, it is possible to adjust the expanding direction of the airbag 30 in various ways by adjusting the time of breakage of the two and the like as compared with the case of using them alone.

Figure 17A:
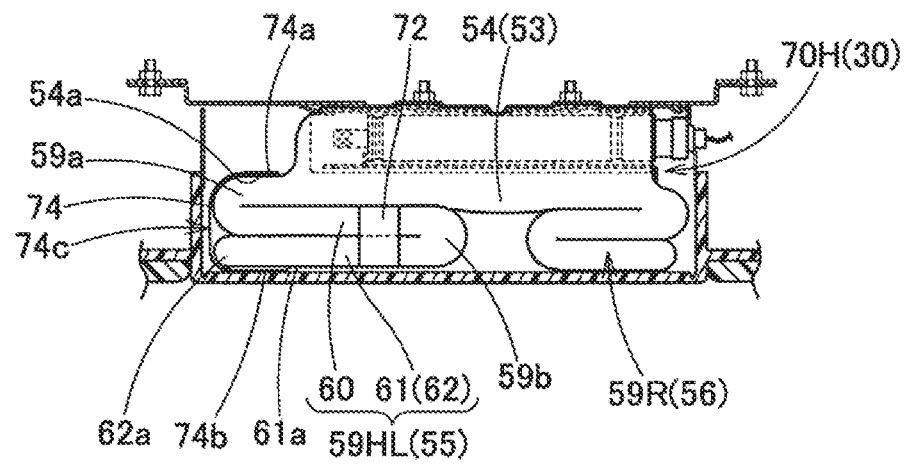
FIGS. 17A and 17B are views illustrating still another modification example of the joining unit used for the folding completed body of the airbag of the embodiment.
Figure 17B:
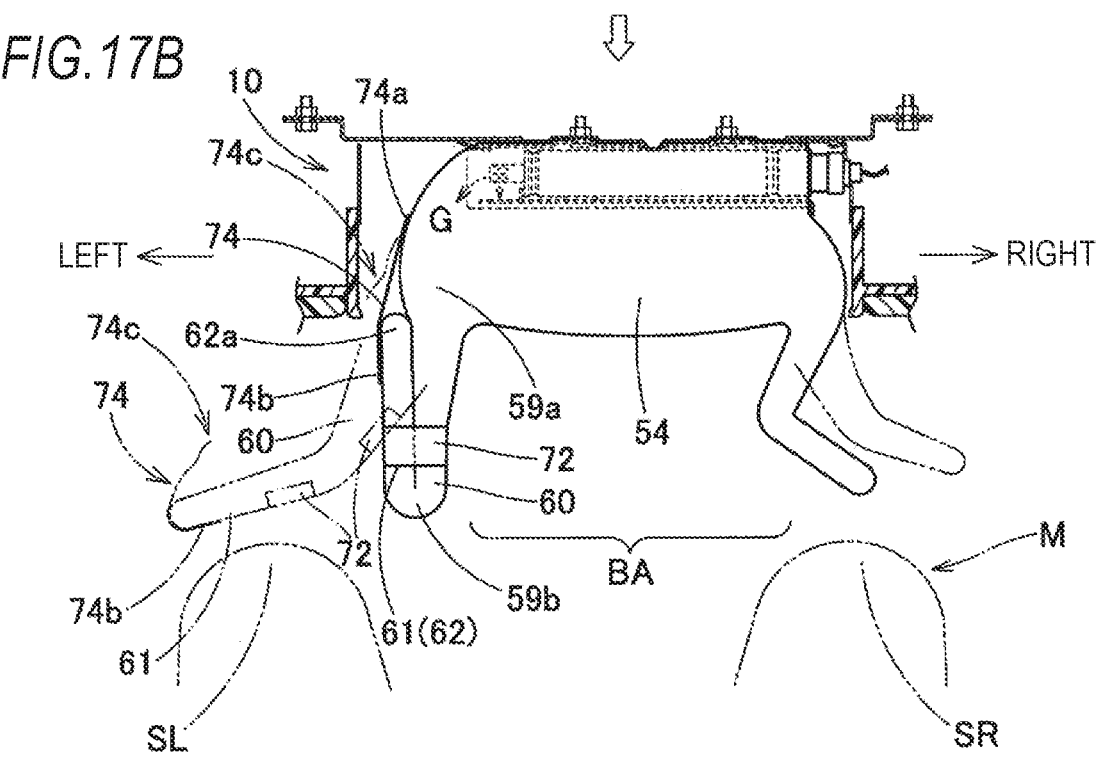

The folding completed body 70H of the airbag 30 illustrated in FIGS. 17A and 17B uses the tape material 72 and the tape material 74 as the joining unit. The tape material 72 is the same as that used for the folding completed body 70 illustrated in FIGS. 8A to 8C and the tape material 72 wraps the entire circumference of the folded portion 59HL in the front-rear direction and can be broken when the joining between the first overlapping portion 60 and the tip side part 61 is released. The tape material 74 is the same as that used for the folding completed body 70A illustrated in FIGS. 10A and 10B, the tape material 74 is attached from the front surface 54a side of the central portion 54 on the outer peripheral side of the first fold 59a to the rear surface 61a side of the folded portion 59HL and can be broken when the joining between the first overlapping portion 60 and tip side part 61 is released.

In this folding completed body 70H, when the airbag 30 starts to expand, until the folding of the first fold 59a is canceled and the first overlapping portion 60 comes out of the rear area BA of the central portion 54, the long folded portion 59HL is maintained in a folded state by the tape material 72 in which the tip side part 61 is joined to the first overlapping portion 60 and the tape material 74 in which the tip 62a side is joined to the central portion 54 side and the tip side part 61 on the tip side of the end side portion 55 does not move rearward so as to separate from the first overlapping portion 60 side of the expanded folded portion 59HL. Then, when the first overlapping portion 60 of the folded portion 59HL is expanded so as to open to the left in the left-right direction so as to be out of the rear area BA of the central portion 54 of the roll folding portion 53, after that, due to the behavior of trying to move away from the first overlapping portion 60 on the tip 62a side, the tape material 72 breaks and an intermediate portion 74c of the tape material 74 also breaks. Then, the folding of the second fold 59b is released and the folded portion 59HL itself expands the tip 62a side of the tip side part 61 to the left in the left-right direction. Therefore, even when the shin S (L, R) approaches the case 10, without any hindrance, along with the central portion 54 of the roll folding portion 53, the end side portion 55, which includes the first overlapping portion 60 and the tip side part 61 which are expanded in the left-right direction, cancels roll folding. As a result, in the airbag 30, the knee receiving portion 32 is arranged on the front side of the knee K (see the chain double-dashed line in FIG. 1).

Since this folding completed body 70H also uses the tape material 72 and the tape material 74 together, it is possible to adjust the expanding direction of the airbag 30 in various ways by adjusting the timing of breakage of the two and the like as compared with the case of using them alone.

Figure 18A:
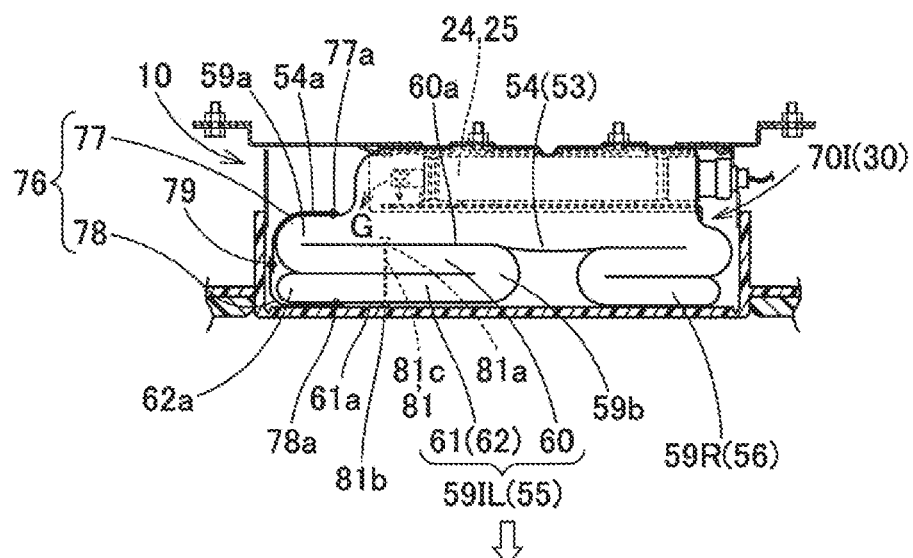
FIGS. 18A and 18B are views illustrating still another modification example of the joining unit used for the folding completed body of the airbag of the embodiment.
Figure 18B:
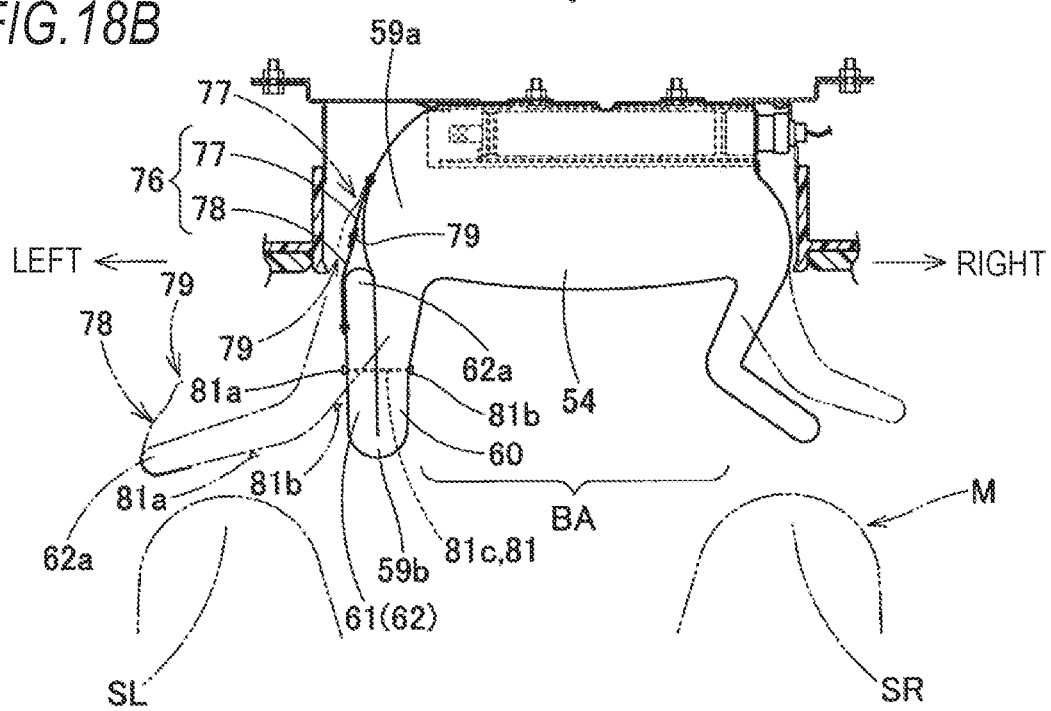

The folding completed body 70I of the airbag 30 illustrated in FIGS. 18A and 18B uses the sheet material 76 and the locking member 81 as the joining unit. The sheet material 76 is the same as that used for the folding completed body 70B illustrated in FIGS. 11A and 11B. The sheet material 76 is made of a flexible cloth or the like having both ends sewn to the front surface 54a side of the central portion 54 and the rear surface 61a side of the folded portion 59IL on the outer peripheral side of the first fold 59a. Further, near the intermediate part between the sutured portions 77a and 78a to the front surface 54a side of the central portion 54 and the rear surface 61a side of the folded portion 59IL, a breakable portion 79 which can be broken when the joining between the first overlapping portion 60 and the tip side part 61 is released is provided. The locking member 81 is the same as that used for the folding completed body 70C illustrated in FIGS. 12A and 12B. The locking member 81 includes the shaft portion 81c which is penetrated by the first overlapping portion 60 and the tip side part 61 and the locking head portions 81a and 81b which are arranged at both ends of the shaft portion 81c and are locked to the front side of the first overlapping portion 60 and the tip side part 61. When the joining between the first overlapping portion 60 and the tip side part 61 is released, the locking head portions 81a and 81b can be divided so as to be separated from each other.

In this folding completed body 70I, when the airbag 30 starts to expand, until the folding of the first fold 59a is canceled and the first overlapping portion 60 comes out of the rear area BA of the central portion 54, the long folded portion 59IL maintains the folded state by the locking member 81 with the tip side part 61 joined to the first overlapping portion 60 and the sheet material 76 with the tip 62a side connected to the central portion 54 side, and the tip side part 61 on the tip side of the end side portion 55 does not move rearward so as to separate from the first overlapping portion 60 side of the expanded folded portion 59IL. Then, when the first overlapping portion 60 of the folded portion 59IL is expanded so as to open to the left in the left-right direction so as to be out of the rear area BA of the central portion 54 of the roll folding portion 53, after that, due to the behavior of trying to leave the first overlapping portion 60 on the tip 62a side, the breakable portion 79 of the sheet material 76 breaks and the vicinity of the shaft portion 81c of the locking member 81, specifically, the shaft portion 81c near the locking head portions 81a and 81b where stress concentration easily occurs, breaks. As a result, the locking head portions 81a and 81b are divided so as to be separated from each other. Then, the folding of the second fold 59b is released and the folded portion 59IL itself unfolds the tip 62a side of the tip side part 61 to the left in the left-right direction. Therefore, even when the shin S (L, R) approaches the case 10, without any hindrance, along with the central portion 54 of the roll folding portion 53, the end side portion 55 which includes the first overlapping portion 60 and the tip side part 61 which are expanded in the left-right direction cancels the folding of the roll folding. As a result, in the airbag 30, the knee receiving portion 32 is arranged on the front side of the knee K (see the chain double-dashed line in FIG. 1).

Also in this folding completed body 70, since the sheet material 76 and the locking member 81 are used together, it is possible to adjust the expanding direction of the airbag 30 in various ways by adjusting the timing of breakage of the two and the like as compared with the case of using them alone.

Figure 19A:
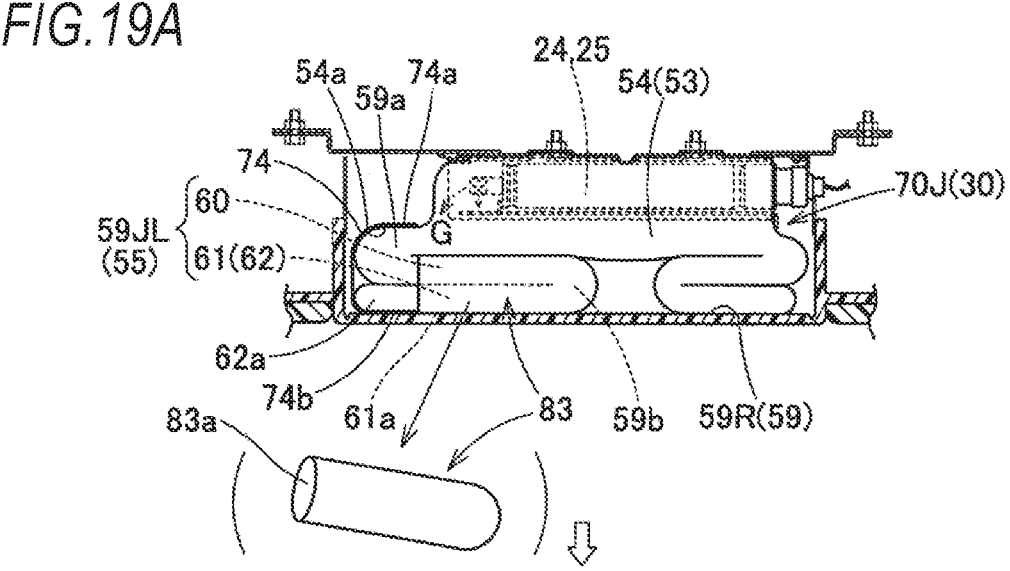
FIGS. 19A and 19B are views illustrating still another modification example of the joining unit used for the folding completed body of the airbag of the embodiment.
Figure 19B:
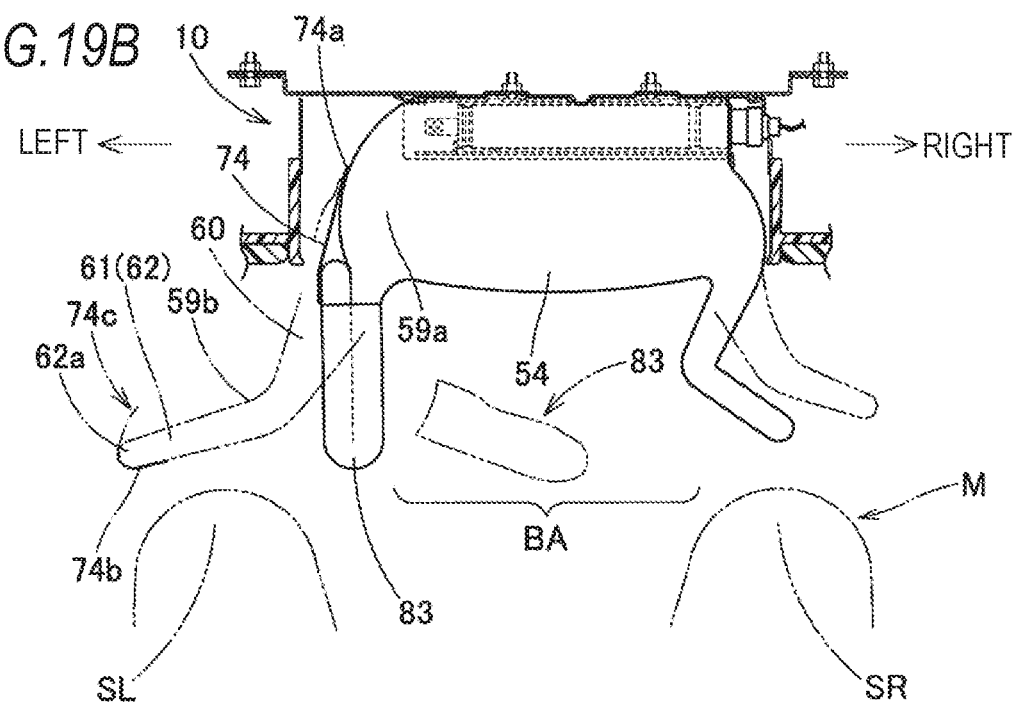

The folding completed body 70J of the airbag 30 illustrated in FIGS. 19A and 19B uses the tape material 74 and the cover 83 as the joining unit. The tape material 74 is the same as that used for the folding completed body 70A illustrated in FIGS. 10A and 10B. The tape material 74 is attached from the front surface 54a side of the central portion 54 on the outer peripheral side of the first fold 59a to the rear surface 61a side of the folded portion 59HL. The tape material 74 can be broken when the joining between the first overlapping portion 60 and the tip side part 61 is released. The cover 83 is similar to that used for the folding completed body 70D illustrated in FIGS. 13A and 13B and covers the folded portion 59JL so as to wrap the folded portion 59JL from around the second fold 59b. The cover 83 is set so as to come off the folded portion 59JL when the joining between the first overlapping portion 60 and the tip side part 61 is released.

In this folding completed body 70J, when the airbag 30 starts to expand, until the folding of the first fold 59a is canceled and the first overlapping portion 60 comes out of the rear area BA of the central portion 54, the long folded portion 59JL maintains the folded state by the tape material 74 in which the tip 62a side is joined to the central portion 54 side and the cover 83 which wraps the first overlapping portion 60 and the tip side part 61 from around the second fold 59b and the tip side part 61 on the tip side of the end side portion 55 does not move rearward so as to separate from the first overlapping portion 60 side of the expanded folded portion 59JL. Then, when the first overlapping portion 60 of the folded portion 59JL is expanded so as to open to the left in the left-right direction so as to be out of the rear area BA of the central portion 54 of the roll folding portion 53, after that, due to the behavior of trying to move away from the first overlapping portion 60 on the tip 62a side, the vicinity of the intermediate portion 74c of the tape material 74 is broken, and the cover 83 comes off from the vicinity of the second fold 59. Then, the folding of the second fold 59b is canceled, and the folded portion 59JL itself expands the tip 62a side of the tip side part 61 to the left in the left-right direction. Therefore, even when the shin S (L, R) approaches the case 10, without any hindrance, along with the central portion 54 of the roll folding portion 53, the end side portion 55 which includes the first overlapping portion 60 and the tip side part 61 which are expanded in the left-right direction cancels the folding of the roll folding. As a result, in the airbag 30, the knee receiving portion 32 is arranged on the front side of the knee K (see the chain double-dashed line in FIG. 1).

Also in this folding completed body 70J, since tape material 74 and cover 83 are used together, it is possible to adjust the expanding direction of the airbag 30 in various ways by adjusting the timings of breakage and disengagement of the two and the like as compared with the case of using them alone.

Moreover, as the joining unit, a plurality of the same joining unit may be used in combination. For example, the folding completed body 70K illustrated in FIGS. 20A to 20C uses two tape materials 72 illustrated in FIGS. 8A to 8C. Strictly speaking, as the tape material 72K in which the width dimension of the tape material 72 in FIGS. 8A to 8C is narrowed, the two tape materials 72K and 72K are arranged apart from each other.

Figure 20A:
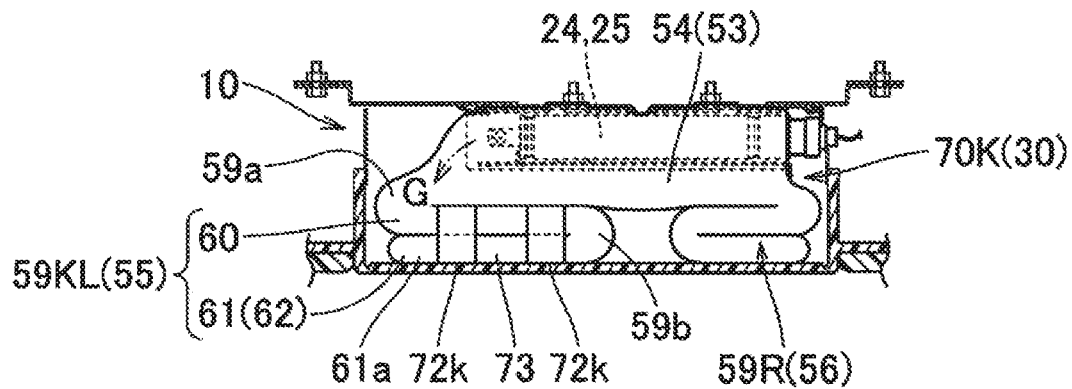
FIGS. 20A to 20C are views illustrating still another modification example of the joining unit used for the folding completed body of the airbag of the embodiment.
Figure 20B:
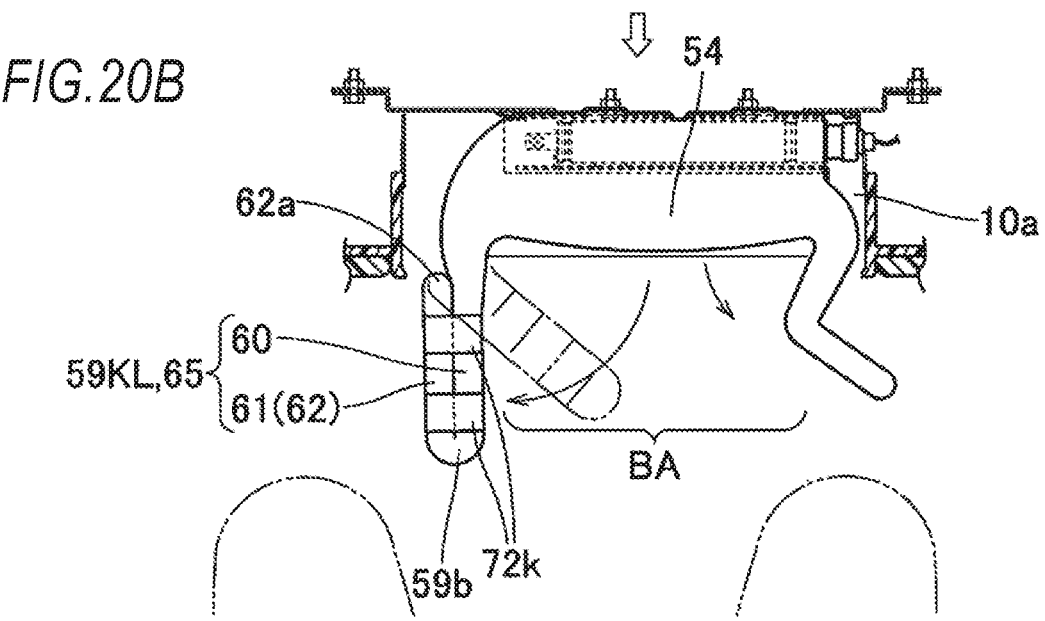
Figure 20C:
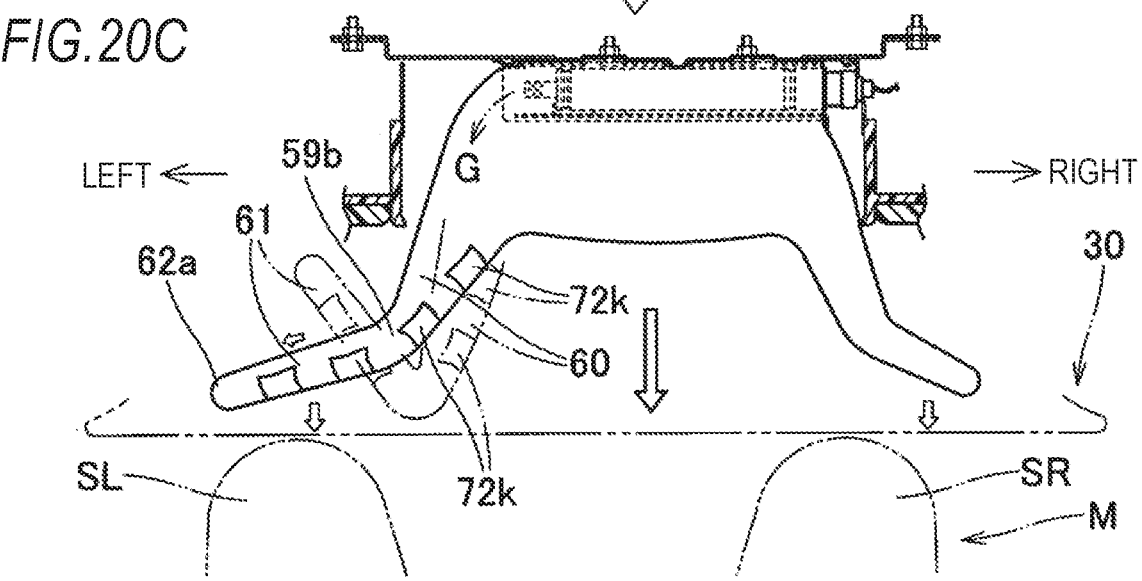

This folding completed body 70K is expanded in the same manner as the folding completed body 70 of FIGS. 8A to 8C as illustrated in FIGS. 20A to 20C. However, in this folding completed body 70K, the gap 73 is provided between the two tape materials 72K and 72K. Therefore, compared to the case where the tape material 72K is arranged in the entire left and right area of the two arranged tape materials 72K and 72K for the folded portion 59KL, the amount of tape material 72K used can be reduced by the amount of the gap 73, and thus the weight can be reduced.

In the embodiment, the knee protection airbag device KA mounted on the front side of the driver as an occupant has been described. However, the invention may be applied to a knee protection airbag device mounted on the front side of a passenger in a passenger seat.

Further, in the knee protection airbag device KA of the embodiment, the case where the protruding opening 10a of the airbag 30 of the case 10 is closed backward and mounted on the vehicle is shown. However, for example, on the front side of the passenger seat, the knee protection airbag device may be arranged with the protruding opening 10a of the case 10 facing downward on the lower end side of the instrument panel in front of the passenger seat so as to face the floor.

What is claimed is:

1. A knee protection airbag device comprising
an airbag which is folded and accommodated in an accommodation part located in front of a passenger seat and is expanded and inflated toward an upper rear side from the accommodation part and causes a knee receiving portion to be arranged in front of the passenger seat when inflation gas flows in, wherein:
the airbag includes an outer peripheral wall which connects outer peripheral edges of an occupant side wall portion on an occupant side and a vehicle body side wall portion on a vehicle body side;
as an expansion completed shape of the airbag, a mounting portion, which is an upstream portion at the time of inflow of the inflation gas, and which is attached to the accommodation part with a lateral width dimension capable of being accommodated in the accommodation part, is disposed on a lower side and the knee receiving portion having a width dimension that is wider on both left and right sides than the mounting portion is arranged on an upper side;
when the air bag is accommodated, the occupant side wall portion and the vehicle body side wall portion are overlapped and expanded flatly and roll-folding is performed such that an upper edge side of the knee receiving portion side approaches a lower edge side of the mounting portion side, end side portions on left and right sides of the roll-folded roll folding portion are formed as folded portions which fold over a central portion near a center in a left-right direction of the roll folding portion, the folded portion is overlapped with the central portion of the roll folding portion to form a folding completed body, and the folding completed body is accommodated in the accommodation part;
the folded portion on at least one side in the left-right direction in the folding completed body is folded over the central portion with at least two folds, and is disposed by joining a first overlapping portion from a first fold on the central portion side to a second fold and a tip side part connected to the first overlapping portion and extending to a tip side of the end side portion with a joining unit; and
a joining strength of the joining unit is set so that the joining between the first overlapping portion and the tip side part is released when the inflation gas flows into the airbag, and when the fold of the first fold is canceled and the first overlapping portion deviates from a rear area of the central portion.

2. The knee protection airbag device according to claim 1, wherein
one of the left and right folded portions of the folding completed body is provided with at least two folds and folded over the central portion, and is provided with the joining unit.

3. The knee protection airbag device according to claim 2, wherein
the airbag at the completion of inflation is arranged so that a mounting center, which is a center of the mounting portion in the left-right direction, is displaced to one side of the left-right direction from a center line in a front-rear direction passing through a center of the knee receiving portion in the left-right direction;
the end side portions on both left and right sides of the roll folding portion are folded with respect to the mounting center side of the central portion of the roll folding portion and formed as the folded portion; and
the folded portion of the folding completed body on a side where the joining unit is provided is a portion on a side of the center line displaced from the mounting center.

4. The knee protection airbag device according to claim 1, wherein
the joining unit are arranged on both left and right sides of the folding completed body.

5. The knee protection airbag device according to claim 1, wherein:
the joining unit is formed by wrapping the entire circumference of the folded portion along the front-rear direction with a breakable tape material; and
the tape material is set to a strength at which it breaks when the joining between the first overlapping portion and the tip side part is released.

6. The knee protection airbag device according to claim 1, wherein:
the joining unit is formed by adhering a breakable tape material from a front side of the central portion on an outer peripheral side of the first fold to a rear side of the folded portion; and
the tape material is set to a strength at which it breaks when the joining between the first overlapping portion and the tip side part is released.

7. The knee protection airbag device according to claim 1, wherein:
the joining unit is formed of a flexible sheet material having both ends sewn to a front side of the central portion on an outer peripheral side of the first fold and a rear side of the folded portion; and
the sheet material has a breakable portion, which is broken when the joining between the first overlapping portion and the tip side part is released, disposed in a vicinity of an intermediate portion between sutured portions on a front side of the central portion and a rear side of the folded portion.

8. The knee protection airbag device according to claim 1, wherein:
the joining unit is formed of a locking member which includes a shaft portion which penetrates the first overlapping portion and the tip side part and locking head portions disposed at both ends of the shaft portion and locked on front sides of the first overlapping portion and the tip side part; and
the locking member is set to have a strength that the locking head portions are divided so as to be separated from each other when the joining between the first overlapping portion and the tip side part is released.

9. The knee protection airbag device according to claim 1, wherein:
the joining unit is formed from a cover which fits the folded portion so as to wrap the folded portion from around the second fold; and
the cover is set to a fitting strength which deviates from the folded portion when the joining between the first overlapping portion and the tip side part is released.

10. The knee protection airbag device according to claim 1, wherein
the folded portion of the folding completed body is configured by including the first overlapping portion and a second overlapping portion as the tip side part which is folded back at the second fold and overlaps the first overlapping portion.

11. The knee protection airbag device according to claim 1, wherein:
a tip side part which is continuous with the first overlapping portion in the folded portion of the folding completed body and extends to a tip side of the end side portion is configured to include a third fold at the tip of the second fold and include a second overlapping portion extending from the second fold to the third fold and a third overlapping portion extending from the third fold; and
the third overlapping portion is configured to be arranged between the first overlapping portion and the second overlapping portion.

12. The knee protection airbag device according to claim 1, wherein:
a tip side part which is continuous with the first overlapping portion in the folded portion of the folding completed body and extends to a tip side of the end side portion is configured to include a third fold at the tip of the second fold and include a second overlapping portion extending from the second fold to the third fold and a third overlapping portion extending from the third fold; and the third overlapping portion is arranged so as to be overlapped on a side of the second overlapping portion that is overlapped with the first overlapping portion, away from the first overlapping portion.

13. The knee protection airbag device according to claim 1, wherein
the joining unit is configured by combining the same one in any one of or at least two different ones of:
a tape material which wraps around the entire circumference of the folded portion in the front-rear direction and is breakable when the joining between the first overlapping portion and the tip side part is released;
a tape material which is attached from the front side of the central portion on the outer peripheral side of the first fold to the rear side of the folded portion and is breakable when the joining between the first overlapping portion and the tip side part is released;
a sheet material which has both ends sewn to the front side of the central portion and the rear side of the folded portion on an outer peripheral side of the first fold and has flexibility such that a vicinity of an intermediate portion between the sutured portions to the front side of the central portion and the rear side of the folded portion can be broken when the joining between the first overlapping portion and the tip side part is released;
a locking member which includes a shaft portion which is penetrated by the first overlapping portion and the tip side part and a locking head portions which are disposed at both ends of the shaft portion and locked to the front sides of the first overlapping portion and the tip side part and is separable so as to separate the locking head portions from each other when the joining between the first overlapping portion and the tip side part is released; and
a cover which fits the folded portion so as to wrap the folded portion from around the second fold and is removed from the folded portion when the joining between the first overlapping portion and the tip side part is released.

14. The knee protection airbag device according to claim 13, wherein:
the joining unit is configured by wrapping the entire circumference of the folded portion in the front-rear direction and using a plurality of tape materials capable of breaking when the joining between the first overlapping portion and the tip side part is released; and
the plurality of tape materials are arranged so as to be separated from each other in the left-right direction.

* * * * *